(12) United States Patent
Koishi

(10) Patent No.: US 7,929,098 B2
(45) Date of Patent: Apr. 19, 2011

(54) LIQUID CRYSTAL DISPLAY ELEMENT, DISPLAY DEVICE, OBSERVATION DEVICE, CAMERA, AND METHOD FOR MANUFACTURING LIQUID CRYSTAL DISPLAY ELEMENT

(75) Inventor: Hiroyuki Koishi, Yokohama (JP)

(73) Assignee: Nikon Corporation, Tokyo (JP)

( * ) Notice: Subject to any disclaimer, the term of this patent is extended or adjusted under 35 U.S.C. 154(b) by 560 days.

(21) Appl. No.: 11/802,740

(22) Filed: May 24, 2007

(65) Prior Publication Data

US 2007/0279569 A1 Dec. 6, 2007

Related U.S. Application Data

(60) Provisional application No. 60/900,340, filed on Feb. 9, 2007.

(30) Foreign Application Priority Data

May 31, 2006 (JP) ................................. 2006-151167
Apr. 26, 2007 (JP) ................................. 2007-116867

(51) Int. Cl.
*G02F 1/1343* (2006.01)
(52) U.S. Cl. ...................................................... 349/142
(58) Field of Classification Search .................. None
See application file for complete search history.

(56) References Cited

U.S. PATENT DOCUMENTS

| 5,625,412 | A | * | 4/1997 | Aciu et al. | 348/222.1 |
| 5,926,655 | A | * | 7/1999 | Irie et al. | 396/51 |
| 5,943,574 | A | * | 8/1999 | Tehrani et al. | 438/300 |
| 5,950,022 | A | * | 9/1999 | Hagiwara | 396/121 |
| 2003/0067458 | A1 | * | 4/2003 | Anzai | 345/204 |
| 2006/0034603 | A1 | | 2/2006 | Homma | |
| 2006/0066796 | A1 | * | 3/2006 | Ohashi et al. | 349/139 |

FOREIGN PATENT DOCUMENTS

| EP | 1 475 654 A1 | 11/2004 |
| JP | A-2001-125086 | 5/2001 |
| JP | A-2004-191415 | 7/2004 |
| JP | A-2006-330103 | 12/2006 |

* cited by examiner

Primary Examiner — Timothy Rude
(74) Attorney, Agent, or Firm — Oliff & Berridge, PLC

(57) ABSTRACT

A liquid crystal display element includes: electrodes that are formed upon a substrate, and include a mark electrode that is formed in a closed loop, an outer electrode that is arranged at a periphery of the mark electrode, and an isolated electrode that is surrounded by the mark electrode; an electrically insulating layer that is disposed between the electrodes and the substrate, and in which through holes are formed that correspond to the mark electrode, the outer electrode, and the isolated electrode; and a wiring layer that is disposed between the electrically insulating layer and the substrate, and upon which wiring is formed that electrically connects the outer electrode and the isolated electrode via the through holes.

20 Claims, 19 Drawing Sheets

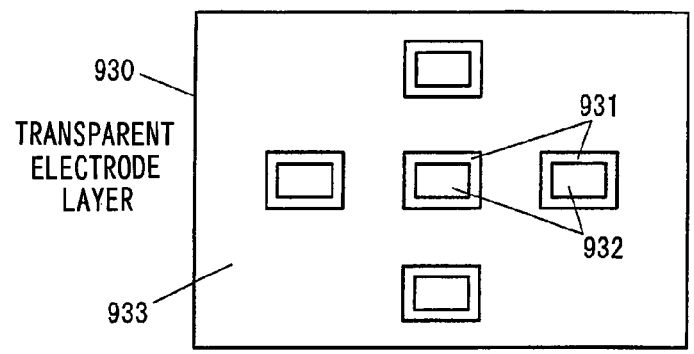
FIG.3A TRANSPARENT ELECTRODE LAYER
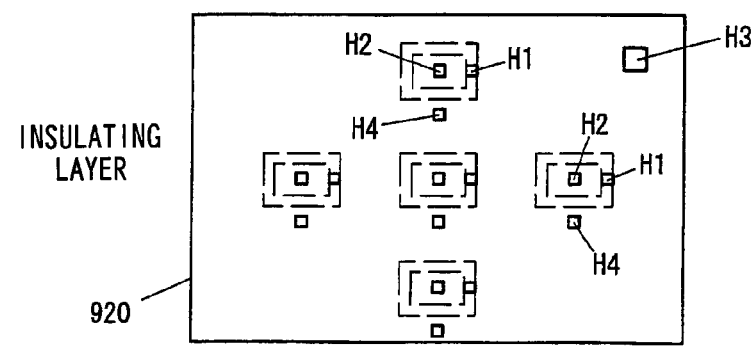
FIG.3B INSULATING LAYER
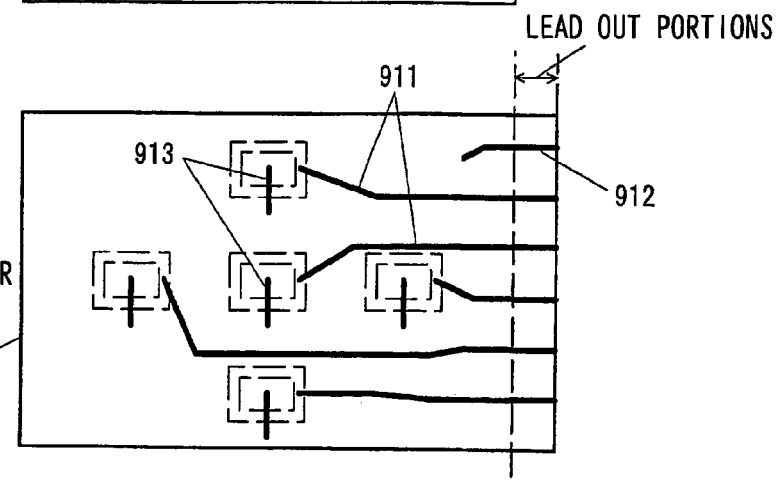
FIG.3C WIRING LAYER

PRIOR ART

B-B SECTION

TRANSPARENT ELECTRODE LAYER

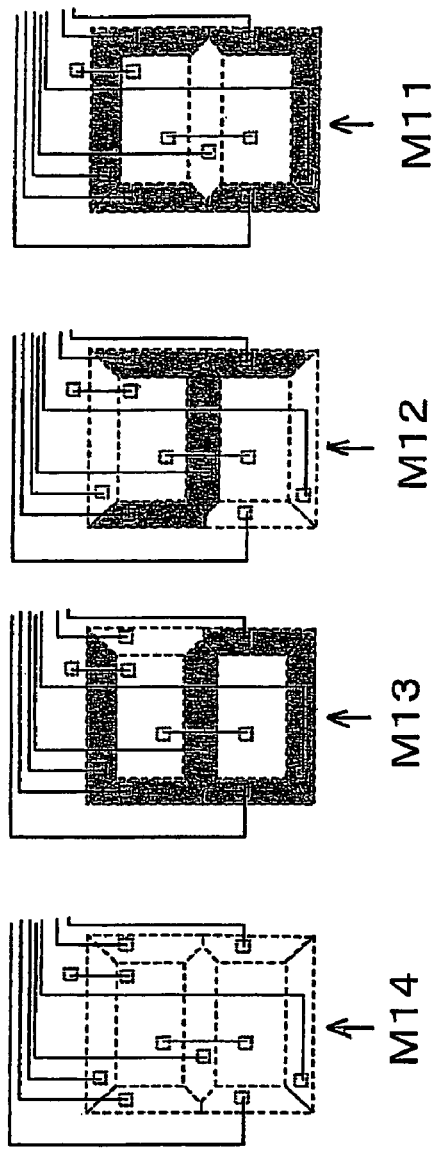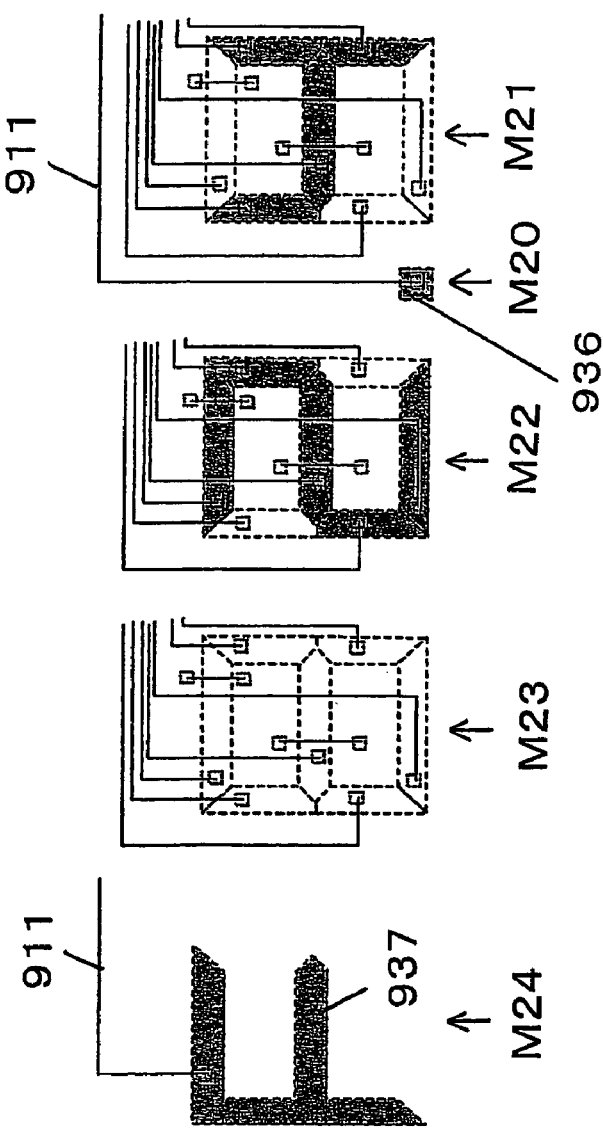
FIG.12A  M1
FIG.12B  M2

M31  M32
⎵
M3

M31  M32
⎵
M3

DISPLAY SECTION M31

DISPLAY SECTION M32

LIQUID CRYSTAL DISPLAY ELEMENT, DISPLAY DEVICE, OBSERVATION DEVICE, CAMERA, AND METHOD FOR MANUFACTURING LIQUID CRYSTAL DISPLAY ELEMENT

This non-provisional application claims the benefit of U.S. Provisional Application No. 60/900,340 filed Feb. 9, 2007. This application also claims priority from Japanese Application No. 2006-151167 filed May 31, 2006 and Japanese Application No. 2007-116867 filed Apr. 26, 2007. The disclosure of each of the earlier applications is incorporated herein by reference in its entirety.

BACKGROUND OF THE INVENTION

1. Field of the Invention

The present invention relates to a liquid crystal display element that uses a liquid crystal material for displaying signs such as characters or marks or the like, to a display device, an observation device, and a camera that use this liquid crystal display element, and to a method for manufacturing such a liquid crystal display element.

2. Description of Related Art

In the prior art, a display device that performs display by using a polymer network liquid crystal is per se known (for example, refer to Japanese Laid-Open Patent Publication 2001-125086). With such a prior art device, display with a transparent electrode that is closed in a ring shape without any breaks is made possible, by disposing an insulating layer in which a through hole is formed between the transparent electrode and a lead wire, and by electrically connecting together the transparent electrode and the lead wire via this through hole.

SUMMARY OF THE INVENTION

However, since lead wires are provided to both the ring shaped transparent electrode, and to the transparent electrode in the region that is surrounded thereby, accordingly, if the number of these ring shaped transparent electrodes is large, the number of lead wires that are extended within the liquid crystal cell becomes large, and the problems arise that the pattern resistance becomes higher due to increase of the wiring length, and also that the yield rate during manufacture decreases.

According to the 1st aspect of the present invention, a liquid crystal display element comprises: electrodes that are formed upon a substrate, and include a mark electrode that is formed in a closed loop, an outer electrode that is arranged at a periphery of the mark electrode, and an isolated electrode that is surrounded by the mark electrode; an electrically insulating layer that is disposed between the electrodes and the substrate, and in which through holes are formed that correspond to the mark electrode, the outer electrode, and the isolated electrode; and a wiring layer that is disposed between the electrically insulating layer and the substrate, and upon which wiring is formed that electrically connects the outer electrode and the isolated electrode via the through holes.

According to the 2nd aspect of the present invention, a liquid crystal display element comprises: a plurality of substrates that sandwich a liquid crystal material; electrodes that are provided between the liquid crystal material and one of the substrates, and include a first electrode that is formed in a closed loop, a second electrode that is arranged at a periphery of the first electrode, and a third electrode that is surrounded by the first electrode and is isolated; an electrically insulating layer that is disposed between the electrodes and the one of the substrates, and in which through holes are formed that correspond to the first electrode, the second electrode, and the third electrode; and a wiring layer that is disposed between the electrically insulating layer and the one of the substrates, and upon which wiring is formed that electrically connects the second electrode and the third electrode via the through holes, and orientation of the liquid crystal material is controlled by voltage being applied to the electrodes via the wiring layer so as to display an indication.

According to the 3rd aspect of the present invention, a liquid crystal display element comprises: electrodes that are formed upon a substrate, and include an isolated electrode that is surrounded by an insulating portion, a mark electrode that is arranged so as to surround the isolated electrode surrounded by the insulating portion, and an outer electrode that is arranged at a periphery of the mark electrode; an electrically insulating layer that is disposed between the electrodes and one of the substrates, and in which through holes are formed that correspond to the isolated electrode, the mark electrode, and the outer electrode; and a wiring layer that is disposed between the electrically insulating layer and the one of the substrates, and upon which wiring is formed that electrically connects the outer electrode and the isolated electrode via the through holes.

According to the 4th aspect of the present invention, a liquid crystal display element comprises: a plurality of substrates that sandwich a liquid crystal material; electrodes that are provided between the liquid crystal material and one of the substrates, and include a first electrode that is surrounded by an insulating portion and is isolated, a second electrode that is arranged so as to surround the isolated electrode surrounded by the insulating portion, and a third electrode that is arranged at a periphery of the second electrode; an electrically insulating layer that is disposed between the electrodes and the one of the substrates, and in which through holes are formed that correspond to the first electrode, the second electrode, and the third electrode; and a wiring layer that is disposed between the electrically insulating layer and the one of the substrates, and upon which wiring is formed that electrically connects the third electrode and the first electrode via the through holes, and orientation of the liquid crystal material is controlled by voltage being applied to the electrodes via the wiring layer so as to display an indication.

According to the 5th aspect of the present invention, in the liquid crystal display element according to the 3rd aspect, it is preferred that: the electrodes comprise a plurality of the mark electrodes and a plurality of the isolated electrodes; and the wiring layer includes wiring that electrically connects together via the through holes, among the plurality of mark electrodes or the plurality of isolated electrodes, mark electrodes or isolated electrodes that are to be controlled to be at the same electrical potential.

According to the 6th aspect of the present invention, in the liquid crystal display element according to the 5th aspect, it is preferred that the plurality of mark electrodes display a character by a combination of the plurality of mark electrodes.

According to the 7th aspect of the present invention, a liquid crystal display element comprises: a plurality of substrates that sandwich a liquid crystal material; electrodes that are provided between the liquid crystal material and one of the substrates, and include a first electrode that is surrounded by an insulating portion and is isolated, a plurality of second electrodes that are arranged so as to surround the isolated electrode surrounded by the insulating portion, and a third electrode that is arranged at a periphery of the second electrodes; an electrically insulating layer that is disposed between the electrodes and the one of the substrates, and in which through holes are formed that correspond to the first electrode, the second electrodes, and the third electrode; and a wiring layer that is disposed between the electrically insulating layer and the one of the substrates, and upon which wiring is formed that electrically connects the third electrode and the first electrode via the through holes, and the liquid crystal material displays a character corresponding to a combination of the plurality of second electrodes to which voltage is applied via the wiring layer.

According to the 8th aspect of the present invention, in the liquid crystal display element according to the 1st aspect, it is preferred that the wiring layer includes a first lead wire that is connected to the mark electrode via one of the through holes, and a second lead wire that is connected to the outer electrode via one of the through holes.

According to the 9th aspect of the present invention, in the liquid crystal display element according to the 3rd aspect, it is preferred that the wiring layer includes a first lead wire that is connected to the mark electrode via one of the through holes, and a second lead wire that is connected to the outer electrode via one of the through holes.

According to the 10th aspect of the present invention, in the liquid crystal display element according to the 1st aspect, it is preferred that there is further provided a liquid crystal that is a polymer dispersed liquid crystal.

According to the 11th aspect of the present invention, in the liquid crystal display element according to the 3rd aspect, it is preferred that there is further provided a liquid crystal that is a polymer dispersed liquid crystal.

According to the 12th aspect of the present invention, in the liquid crystal display element according to the 1st aspect, it is preferred that there is further provided a liquid crystal in which a hologram is formed by a polymer dispersed liquid crystal in a region that corresponds to the mark electrode.

According to the 13th aspect of the present invention, in the liquid crystal display element according to the 3rd aspect, it is preferred that there is further provided a liquid crystal in which a hologram is formed by a polymer dispersed liquid crystal in a region that corresponds to the mark electrode.

According to the 14th aspect of the present invention, a display device comprises: a liquid crystal display element according to the 8th aspect; a power supply that applies voltages to the electrodes via the first and second lead wires; and a control circuit that controls the voltages applied by the power supply, so as to cause the liquid crystal display element to display an indication.

According to the 15th aspect of the present invention, in the display device according to the 14th aspect, it is preferred that the liquid crystal display element comprises a liquid crystal that is a polymer dispersed liquid crystal.

According to the 16th aspect of the present invention, in the display device according to the 14th aspect, it is preferred that the liquid crystal display element displays a figure or a character according to the mark electrode to which voltage is applied via the wiring layer.

According to the 17th aspect of the present invention, an observation device comprises: a display device according to the 14th aspect; and an optical element that creates an image with light that has passed through the liquid crystal display element.

According to the 18th aspect of the present invention, a camera comprises: a liquid crystal element according to the 1st aspect; an image sensor that captures an image with a photographic optical system; and a photography control circuit that controls the image sensor, and the liquid crystal display element displays control information related to the photography control circuit.

According to the 19th aspect of the present invention, a method for manufacturing a liquid crystal display element, comprises: providing, upon a substrate, a wiring layer having wiring; providing, upon the substrate upon which the wiring layer is provided, an electrically insulating layer having through holes that correspond to positions of the wiring; and providing, upon the substrate upon which the electrically insulating layer is provided, electrodes that correspond to positions of the through holes and include a mark electrode that is formed in a closed loop, an isolated electrode that is surrounded by the mark electrode, and an outer electrode that is arranged at a periphery of the mark electrode, and the isolated electrode and the outer electrode are electrically connected together by the wiring.

According to the 20th aspect of the present invention, a method for manufacturing a liquid crystal display element, comprises: forming, upon a substrate, a wiring layer having wiring; providing, upon the substrate upon which the wiring layer is provided, an electrically insulating layer having through holes that correspond to positions of the wiring; providing, upon the substrate upon which the electrically insulating layer is provided, electrodes that correspond to positions of the through holes and include an isolated electrode that is surrounded by an insulating portion, a plurality of mark electrodes that are arranged so as to surround the isolated electrode surrounded by the insulating portion and an outer electrode that is arranged at a periphery of the plurality of mark electrodes, and the isolated electrode and the outer electrode are electrically connected together by the wiring.

BRIEF DESCRIPTION OF T-HE DRAWINGS

FIG. 2A is an elevation view thereof, and FIG. 2B is an A-A sectional view thereof;

Figure 4:
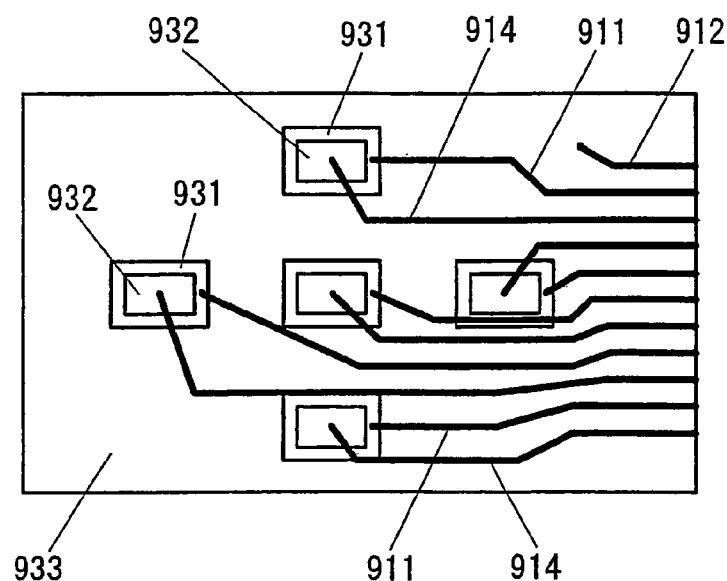
Figure 5:
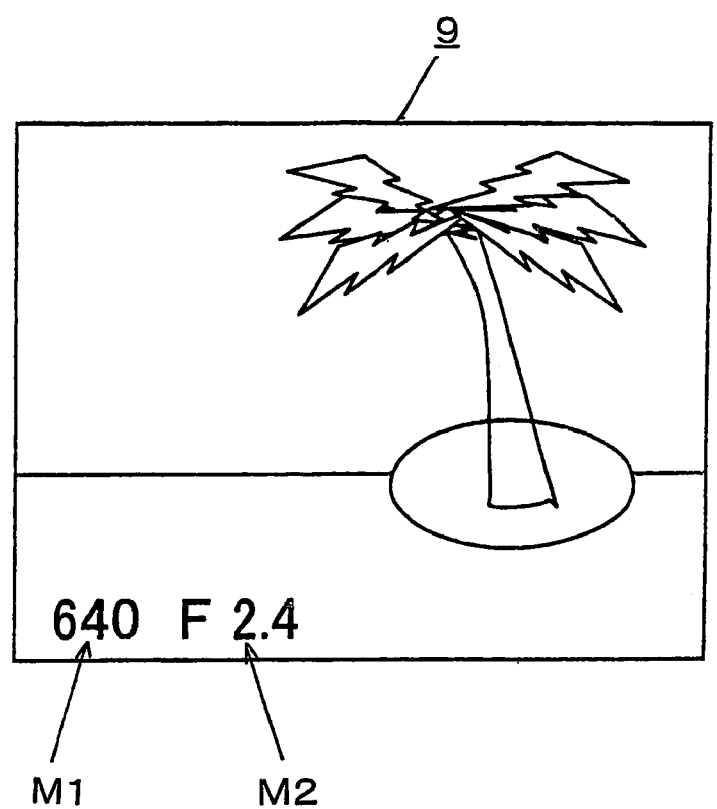
Figure 6:
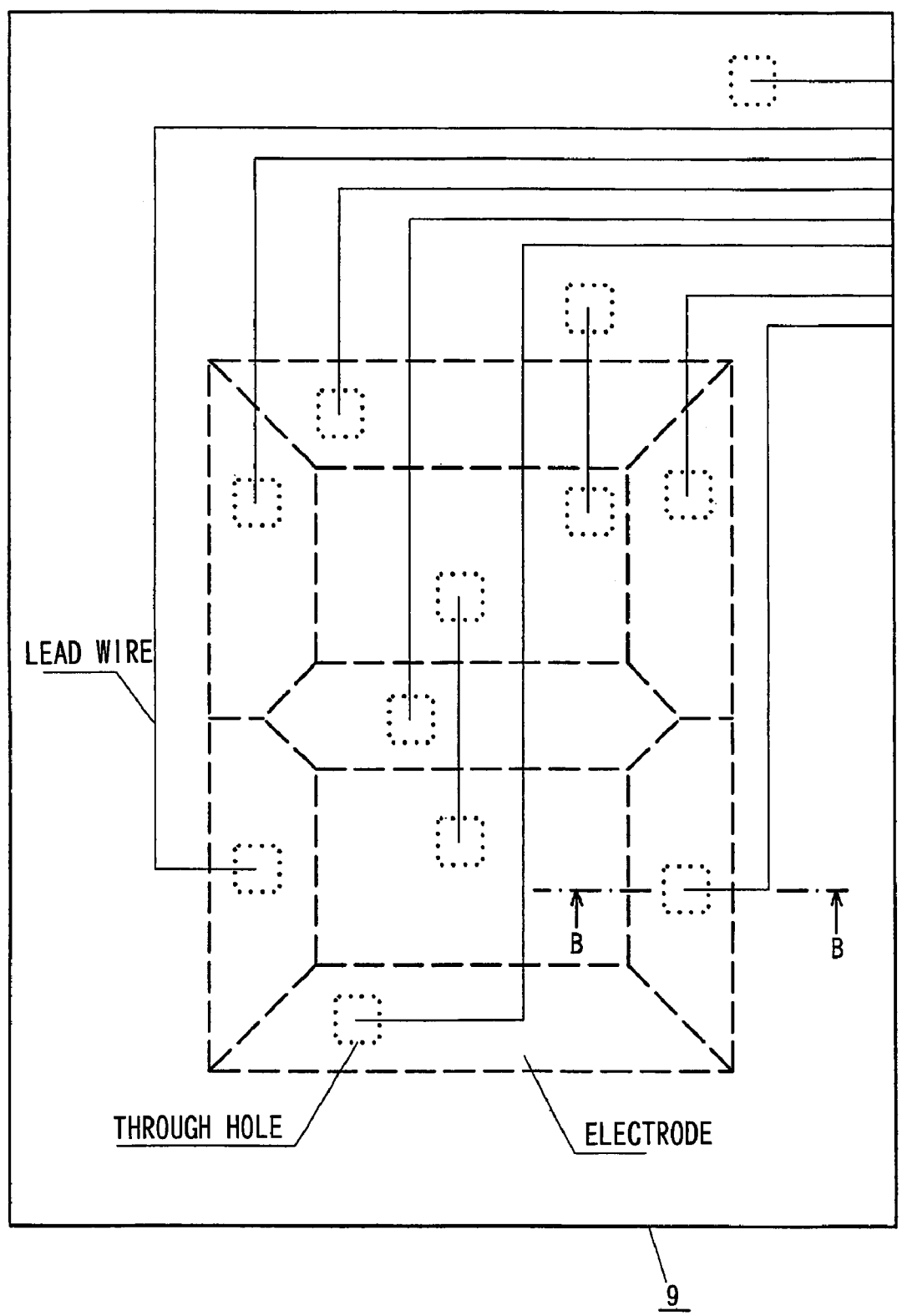
Figure 7:
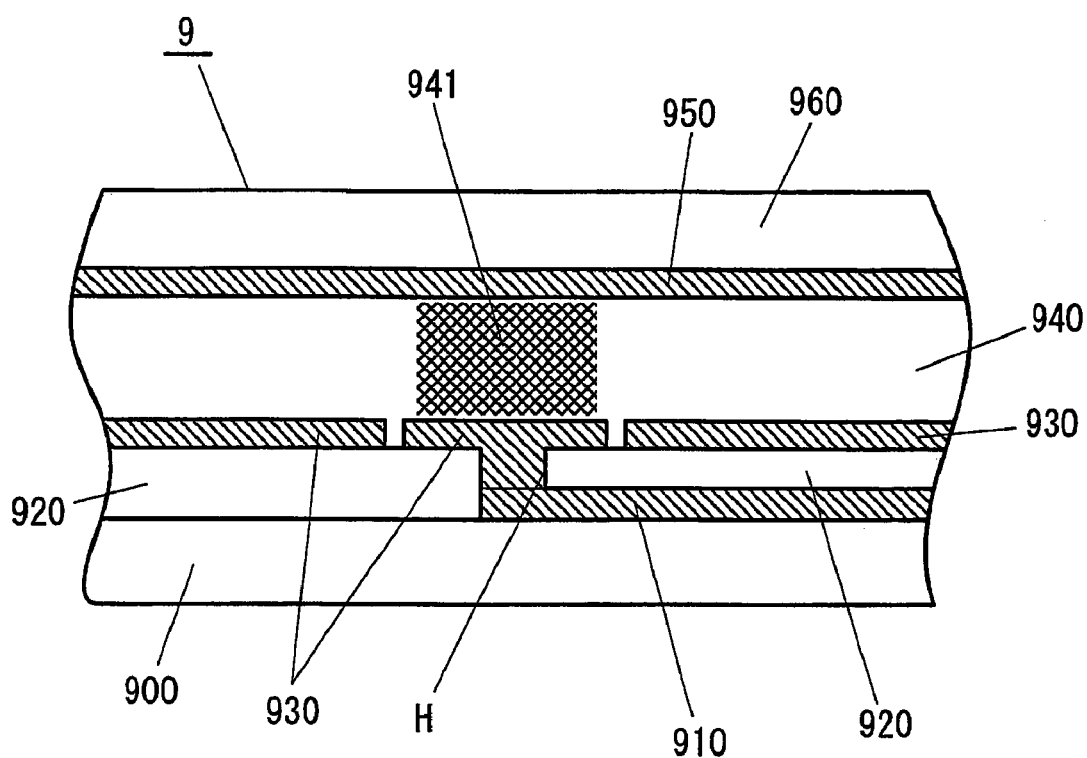
Figure 8:
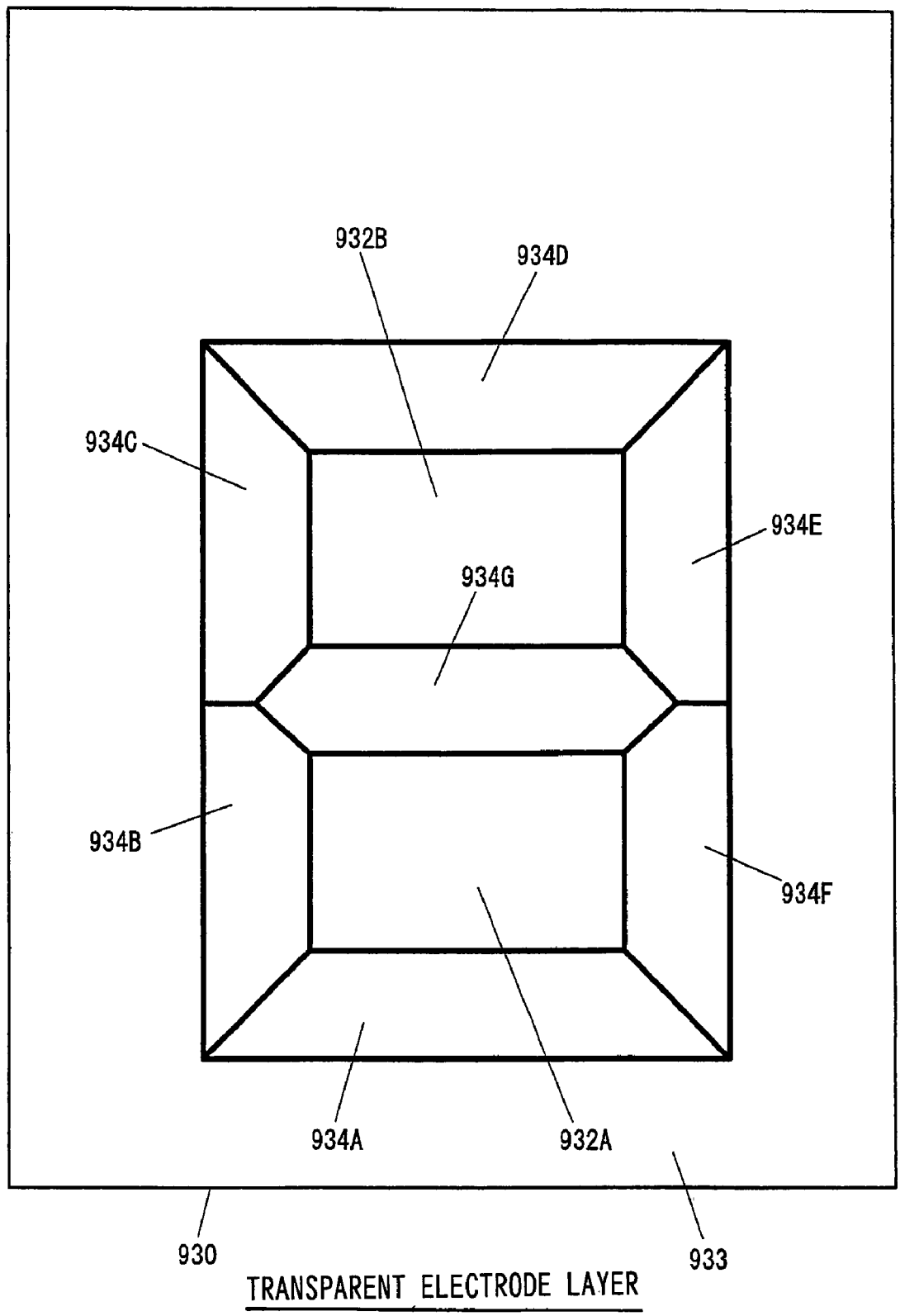
Figure 9:
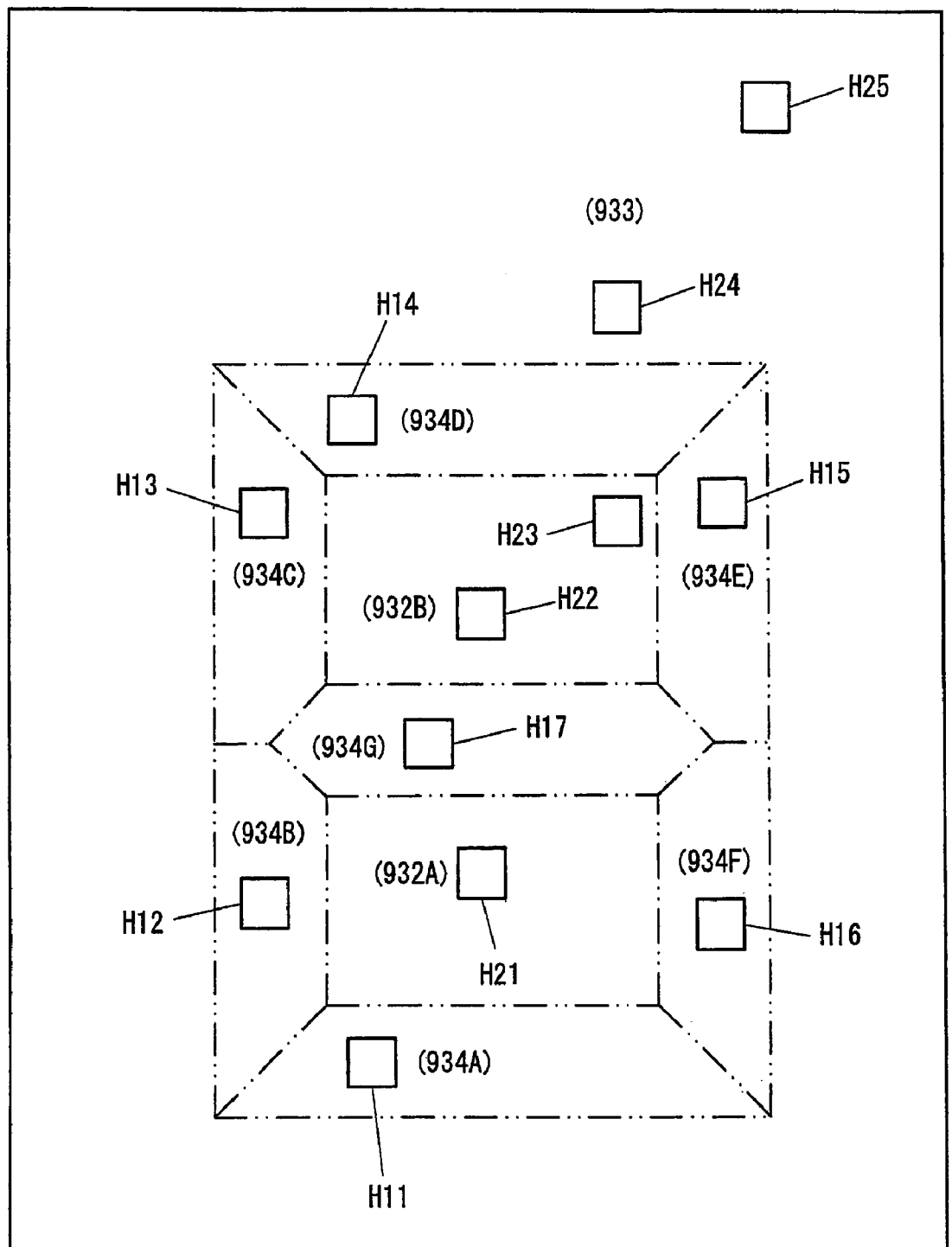
Figure 10:
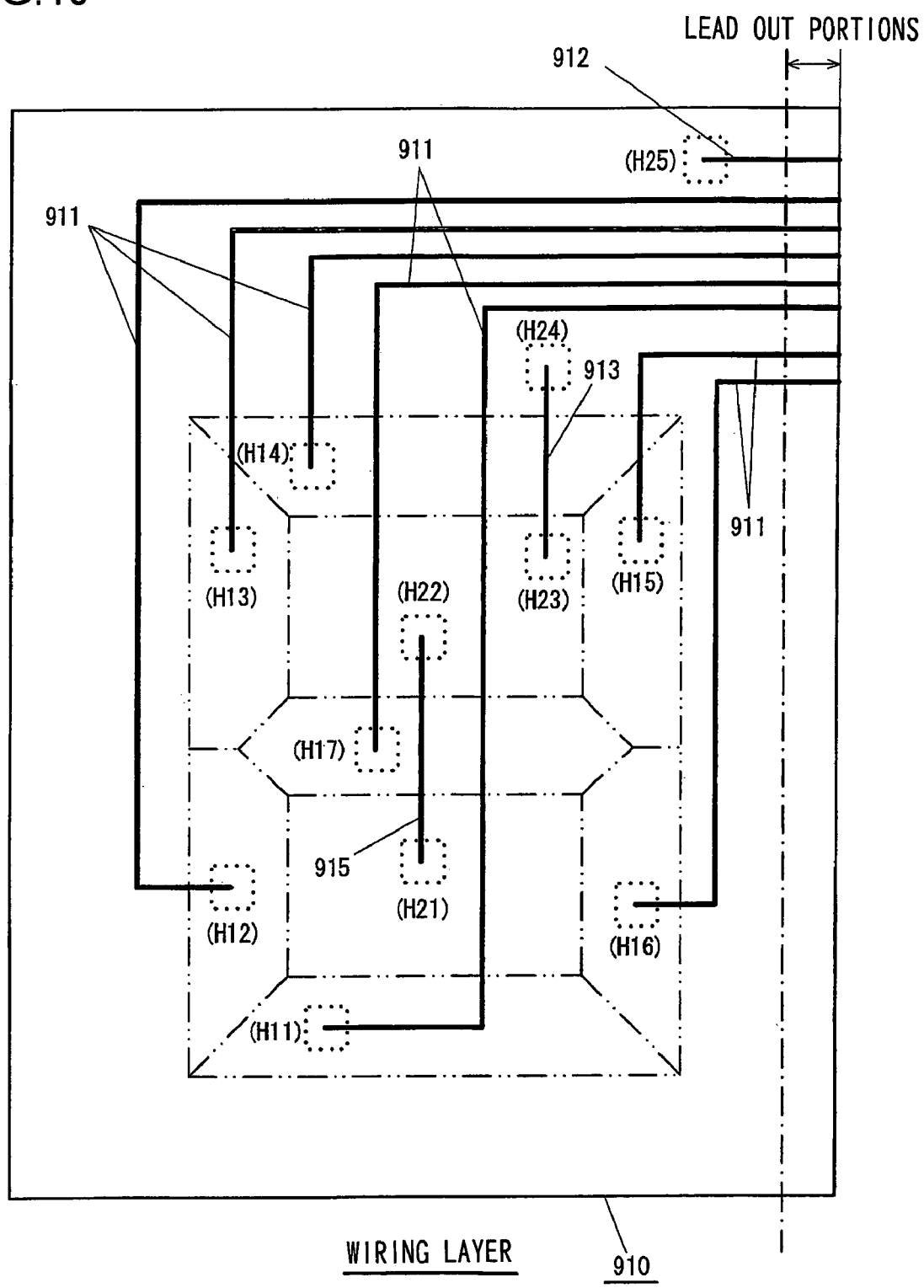
Figure 11:
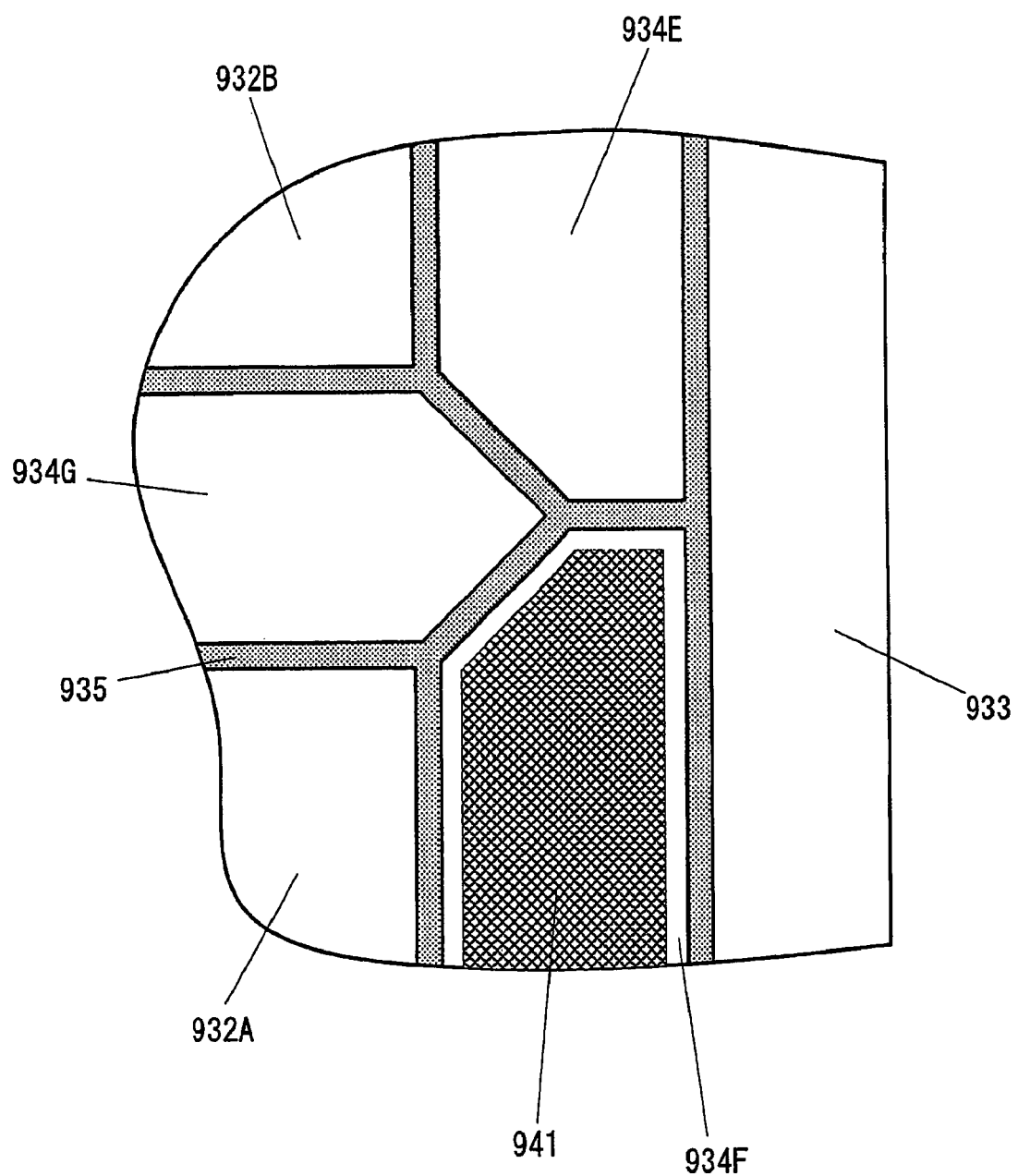
Figure 13A:
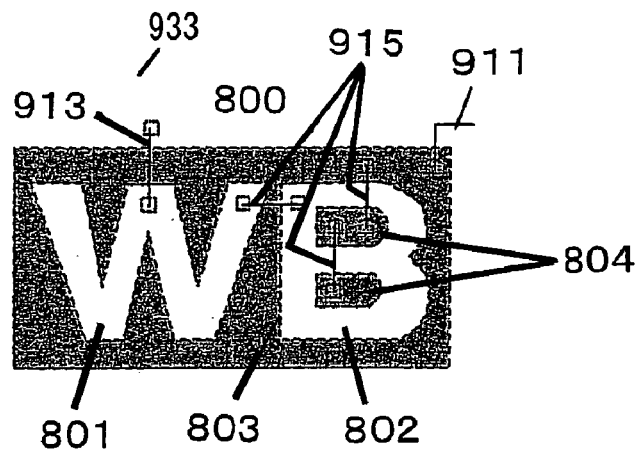
Figure 13B:
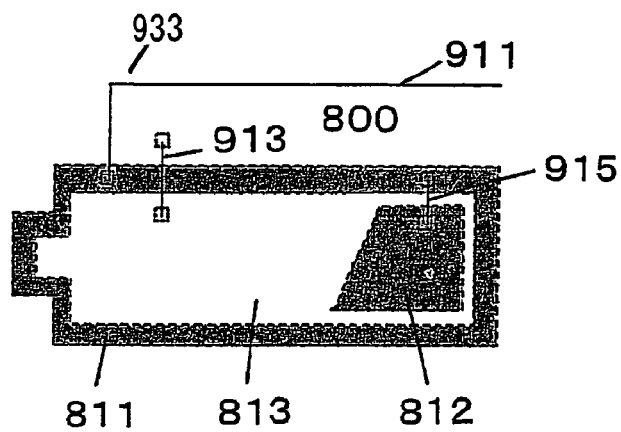
Figure 13C:
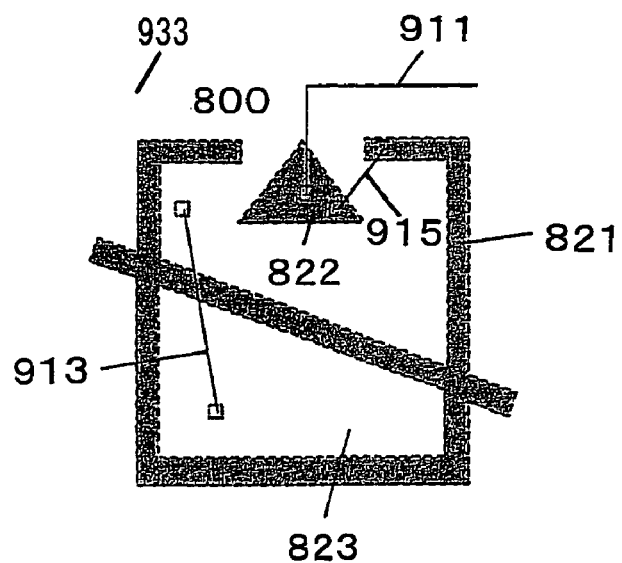
Figure 14A:
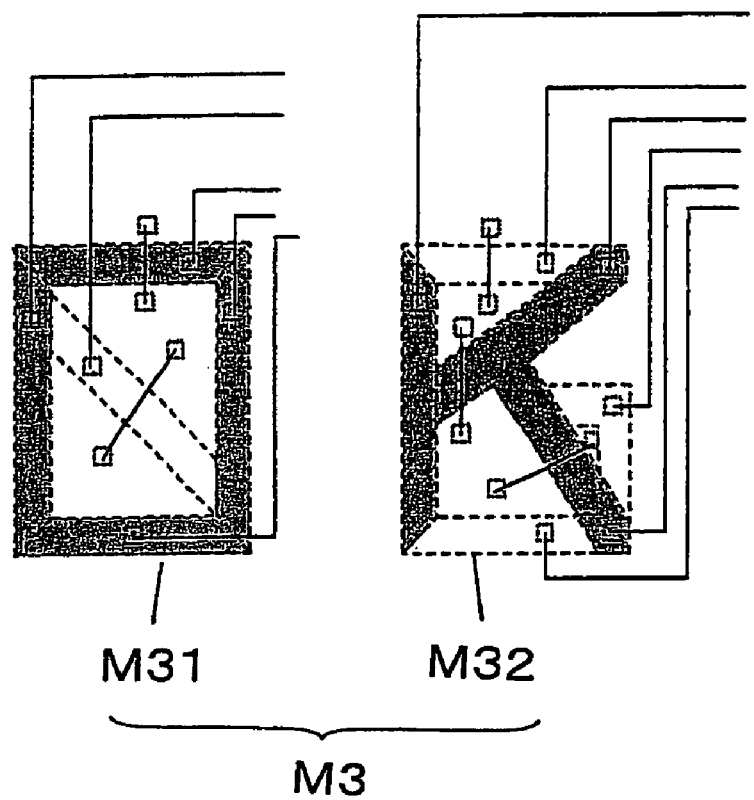
Figure 14B:
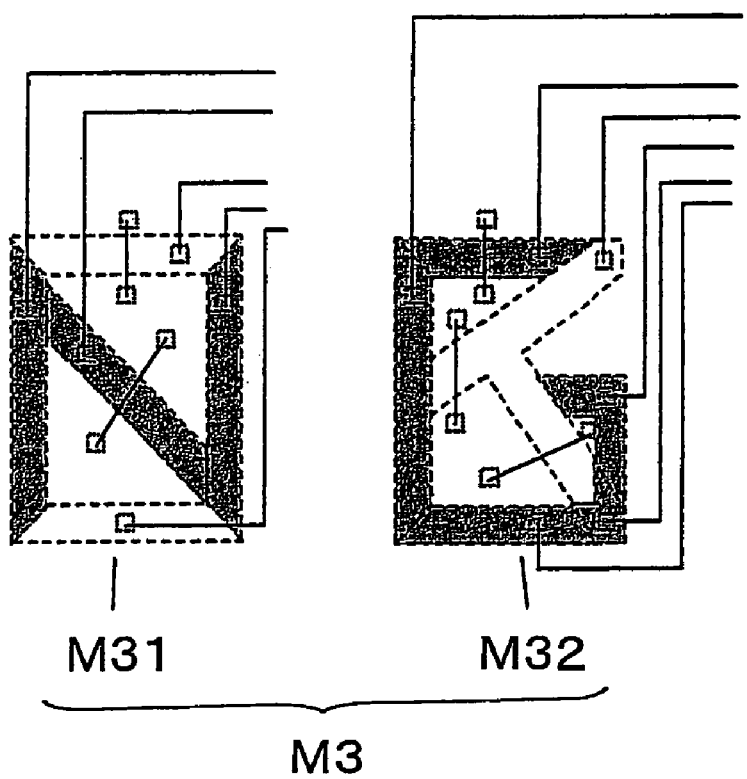
Figure 15:
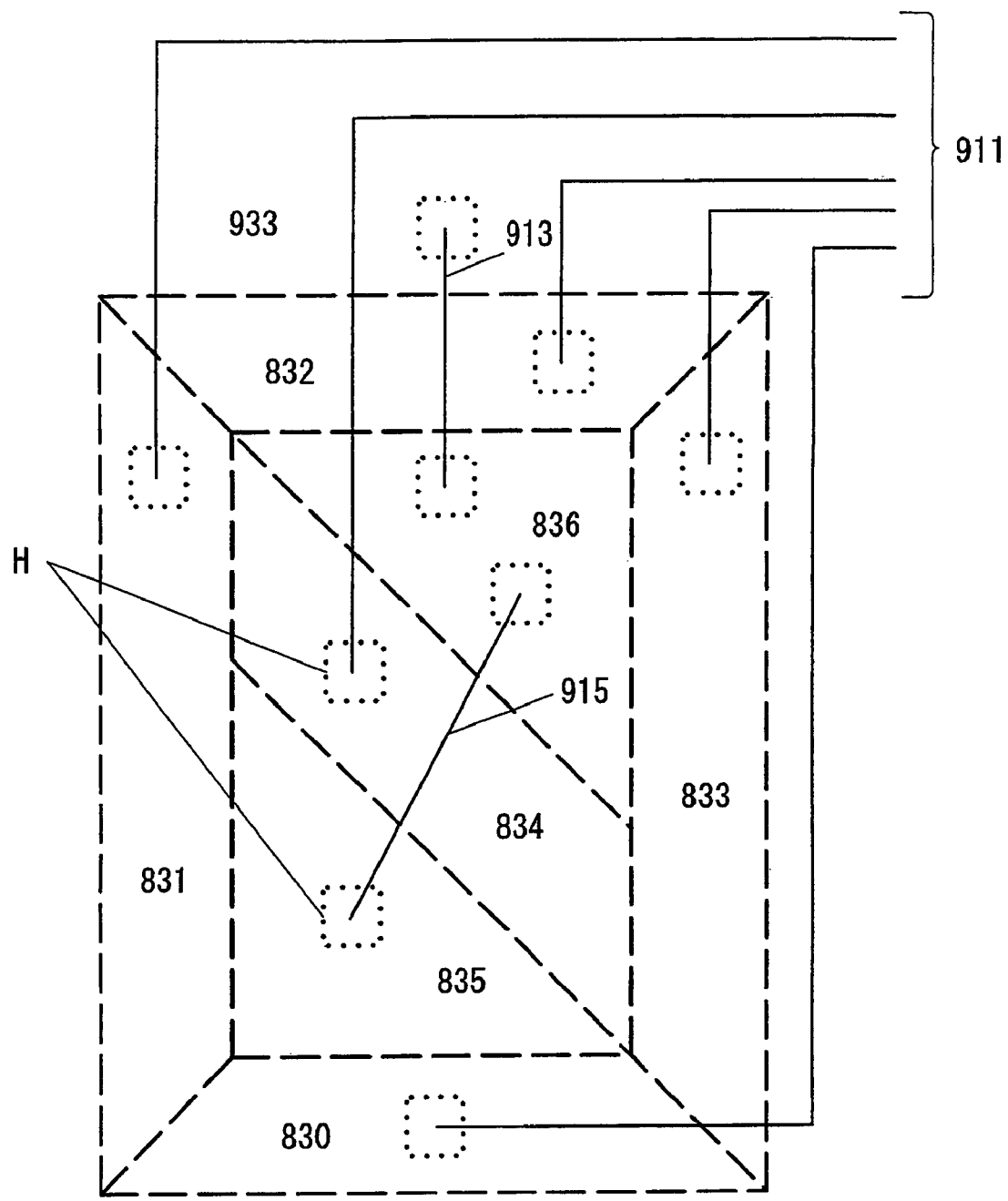
Figure 16:
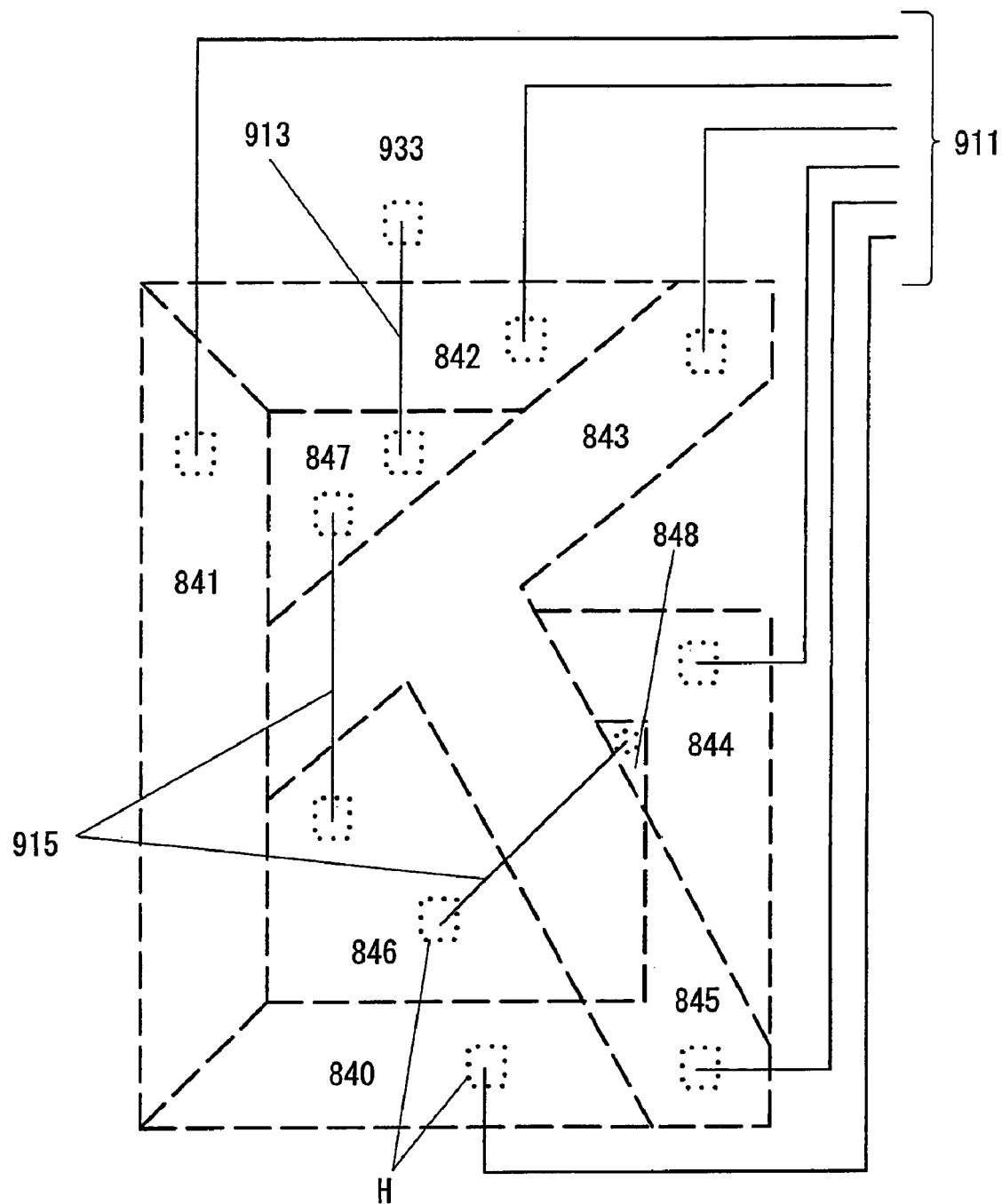
Figure 17:
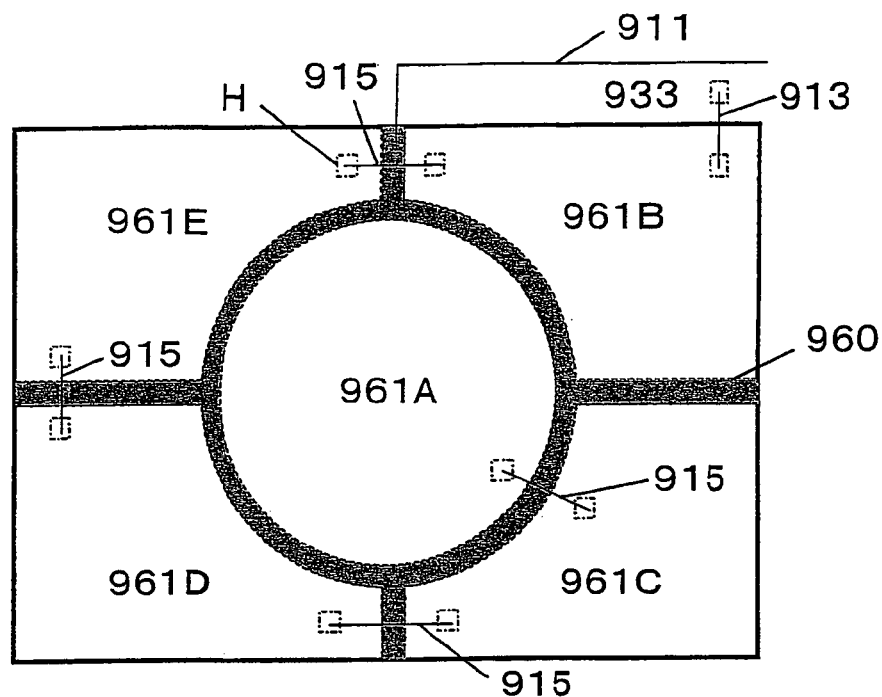
Figure 17:
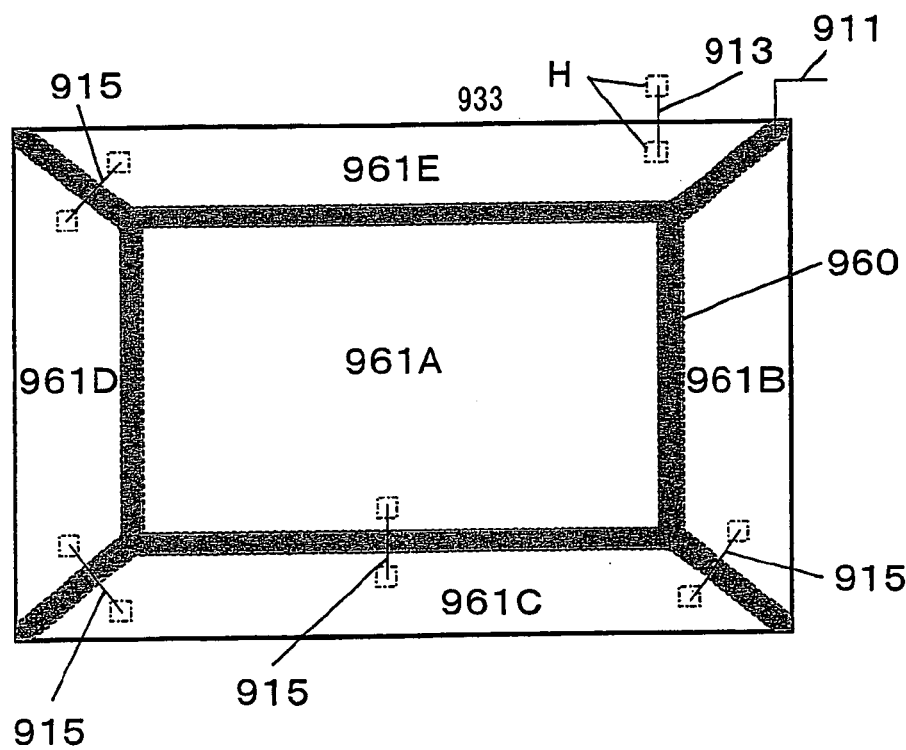
Figure 18:
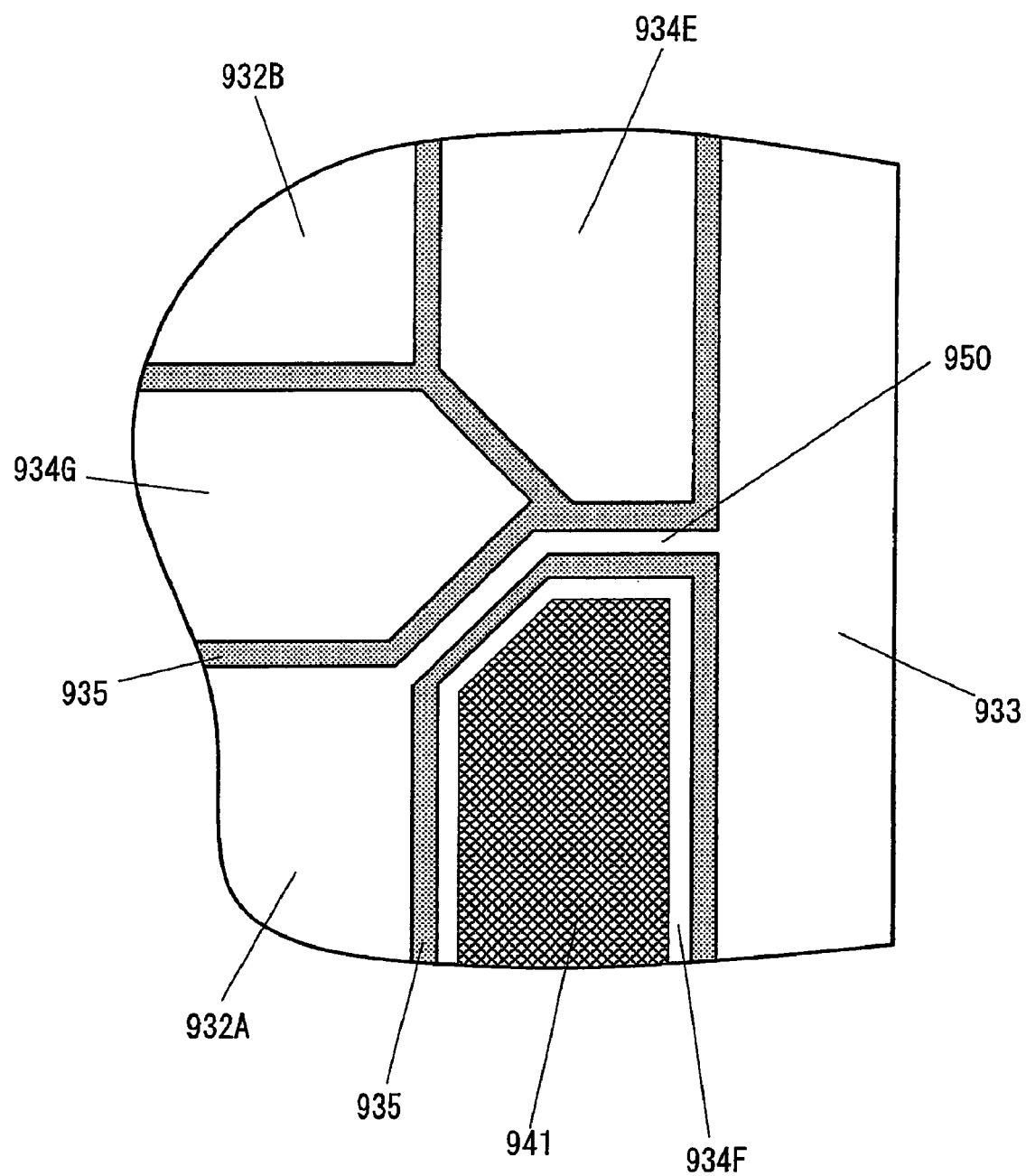

FIGS. 3A through 3C explain the details of various layers of this liquid crystal display element 9: FIG. 3A shows a transparent electrode layer 930, FIG. 3B shows an insulating layer 920, and FIG. 3C shows a wiring layer 910;

FIG. 4 is a figure showing an example of wiring in a prior art liquid crystal display element;

FIG. 5 is a figure showing an example of an in-viewfinder display according to a second embodiment;

FIG. 6 is a figure relating to a display unit for one character, and shows electrodes, through holes, and wiring as superimposed;

FIG. 7 is a figure showing a cross section of FIG. 6, taken in a plane shown by the line B-B in that figure;

FIG. 8 is a plan view showing a transparent electrode layer 930 of the liquid crystal display element shown in FIG. 6;

FIG. 9 is a plan view showing an insulating layer 920 of the liquid crystal display element shown in FIG. 6;

FIG. 10 is a plan view showing a wiring layer 910 of the liquid crystal display element shown in FIG. 6;

FIG. 11 is an enlarged view showing a portion in which mark electrodes 934E through 934G approach one another;

FIGS. 12A and 12B are figures showing an example of a display provided by the liquid crystal display element shown in FIG. 6: FIG. 12A shows the case of a legend M1, while FIG. 12B shows the case of a legend M2;

FIGS. 13A through 13C are figures showing various different legends displayed by liquid crystal display elements 9: FIG. 13A shows the case of a legend that is displayed in order to indicate whether an auto white balance function is ON or OFF, FIG. 13B shows the case of a legend that is displayed in order to indicate a battery remaining amount, and FIG. 13C shows the case of a legend that is displayed in order to indicate whether a memory card is installed or not installed;

FIGS. 14A and 14B are figures showing an example of display of another legend M3;

FIG. 15 is a figure showing electrodes, wires, and through holes of a display unit M31;

FIG. 16 is a figure showing electrodes, wires, and through holes of another display unit M32;

FIGS. 17A and 17B are figures showing marks that display a composition frame, in which FIG. 17A shows a first example, and FIG. 17B shows a second example; and FIG. 18 is a figure for explanation of a wiring electrode 950.

Figure 19:
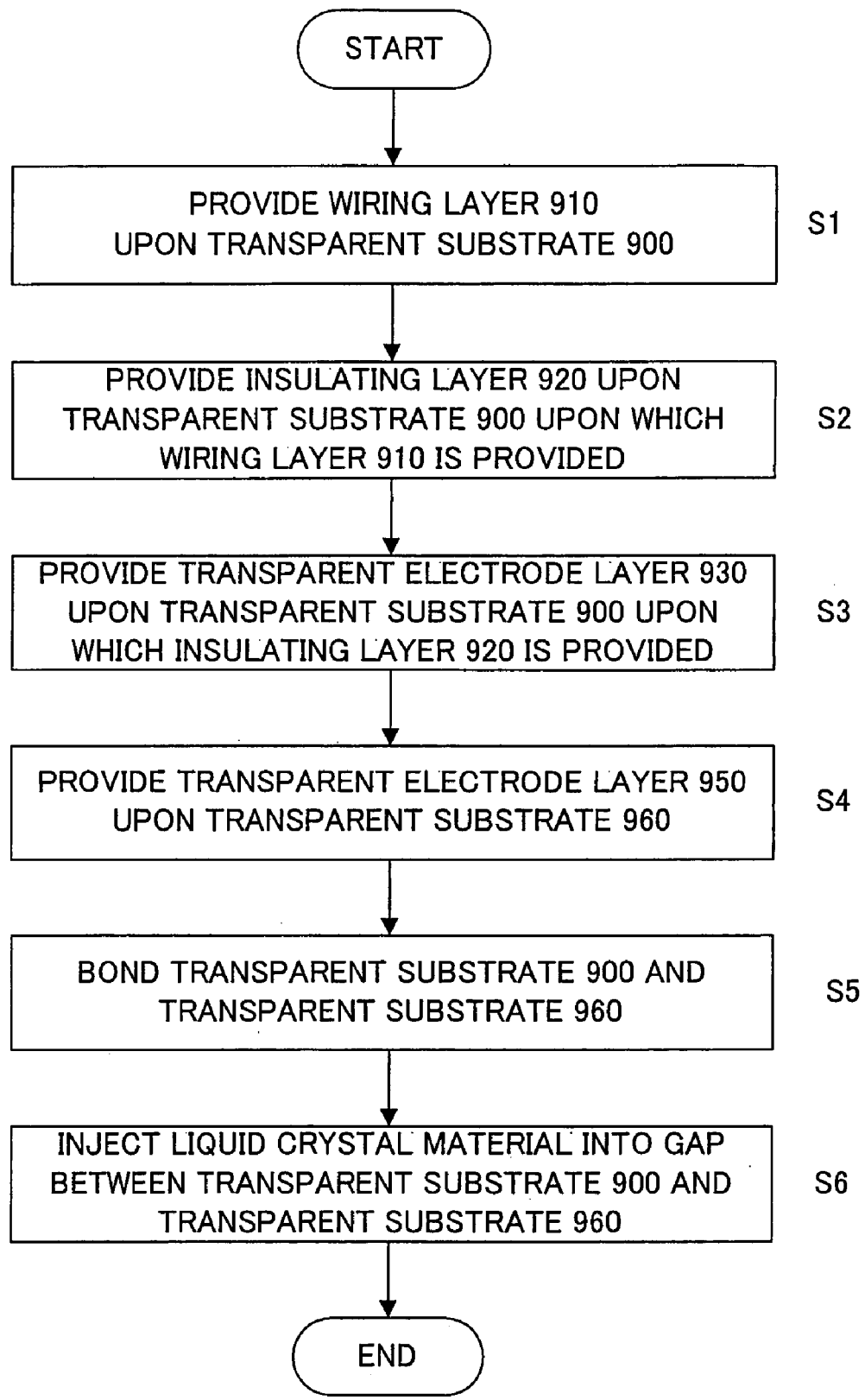

FIG. 19 shows a flowchart of a method for manufacturing the liquid crystal display element 9 according to the first embodiment or the second embodiment.

DESCRIPTION OF THE PREFERRED EMBODIMENTS

In the following, preferred embodiments for implementation of the present invention will be explained with reference to the drawings.

Embodiment One

Figure 1:
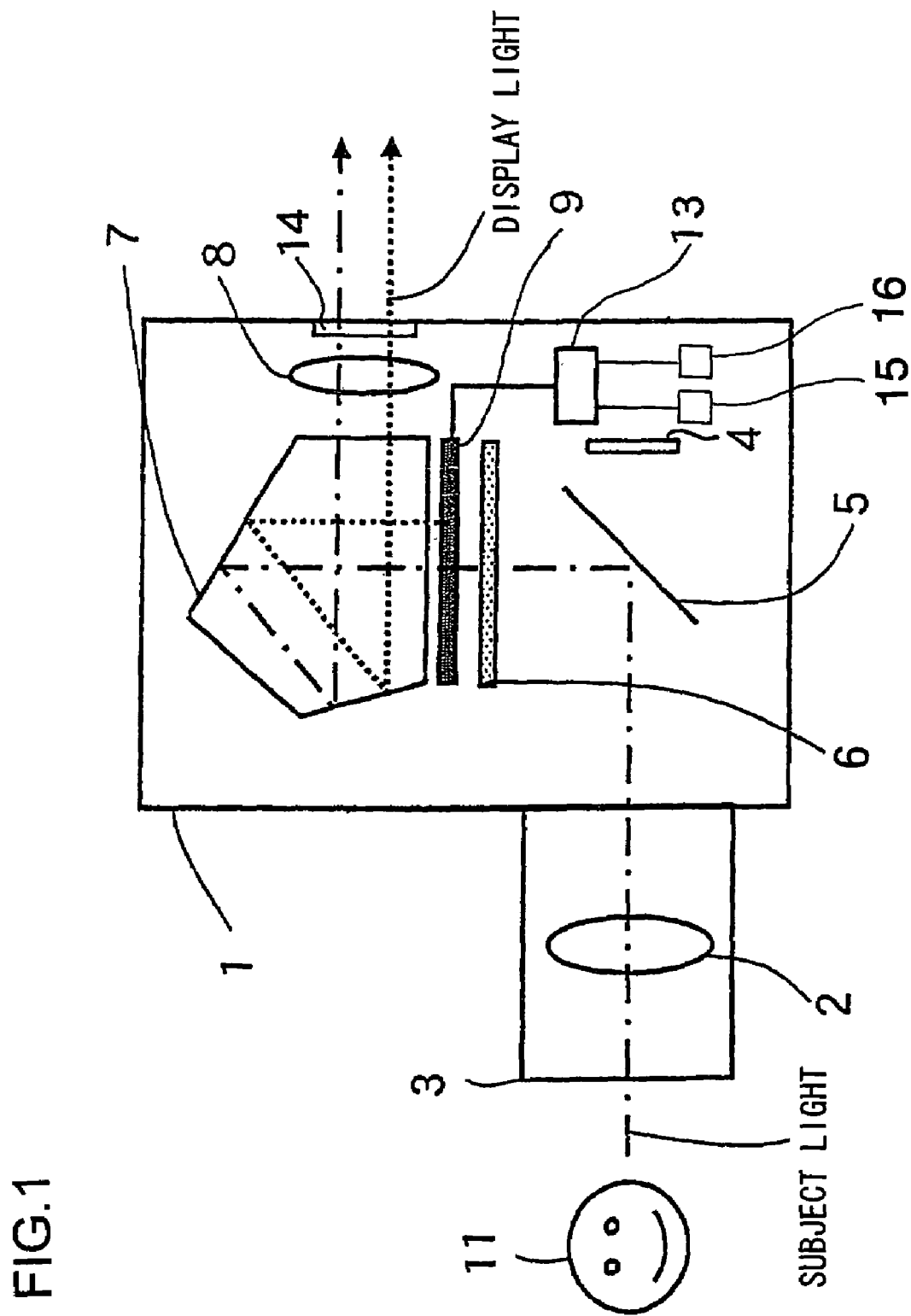
FIG. 1 is a block diagram showing the general structure of a camera in which a display device according to the present invention is employed as an in-viewfinder display.

FIG. 1 is a figure showing a first embodiment of the present invention, and is a block diagram showing the general structure of a camera in which a display device according to the present invention is employed as an in-viewfinder display. A lens barrel 3 that incorporates a photographic lens 2 is removably installed to a camera body 1. 4 is a film that is provided as a recording medium. Although in FIG. 1 a single lens reflex camera that uses a silver halide film is shown by way of example, an image sensor (an image capturing device) such as CCD or a CMOS or the like may also be used as the recording medium in the case of, for example, a single lens reflex type digital camera.

A mirror 5 is disposed between the photographic lens 2 and the film 4, and reflects light from a photographic subject to a viewfinder optical system. It should be understood that a shutter is provided between the film 4 and the mirror 5, although this is not shown in the figures. A viewfinder screen 6 is disposed at a position that is optically equivalent to the photosensitive material surface of the film 4. Light from the photographic subject 11 is reflected by the mirror 5, and is imaged upon the viewfinder screen 6. The image of the photographic subject that has thus been imaged upon the viewfinder screen 6 may be observed from a viewfinder eyepiece section 14 via a penta prism 7 and an eyepiece lens 8. It should be understood that, during photography, the mirror 5 is shifted from being upon the optical path to away from the optical path, so that the image of the photographic subject is imaged upon the film 4.

Furthermore, a liquid crystal element 9 that is used as an in-viewfinder display device is disposed adjacent to the viewfinder screen 6 within the camera body 1. A polymer dispersed liquid crystal is used in this liquid crystal display element 9. Such polymer dispersed liquid crystal may be generally classified as being either a polymer network liquid crystal or a holographic polymer dispersed liquid crystal, but any type of liquid crystal may be employed in the liquid crystal display element of the present invention. Furthermore, the present invention is not limited to a polymer dispersed liquid crystal; a guest-host liquid crystal or the like may also be employed. In the following, the case in which a polymer network liquid crystal will be explained by way of example.

A polymer network liquid crystal is one in which a liquid crystal with anisotropic refractive index is present within a polymer in the form of a network; and, when no voltage is applied, isotropic scattering of the incident light occurs, so that it presents an opaque white appearance. On the other hand, when a voltage is applied, the liquid crystal molecules come to be oriented in the vertical direction with respect to the substrate, so that the liquid crystal becomes transparent to incident light. Due to this, when a liquid crystal element 9 of this type is disposed over the viewfinder screen 6, the regions thereof to which no voltage is applied so that the light from the photographic subject is isotropically scattered, when looked at from the viewfinder, come to appear as dark or black, as compared to the regions to which voltage is applied.

[Explanation of the Structure of the Liquid Crystal Display Element 9]

Figure 2A:
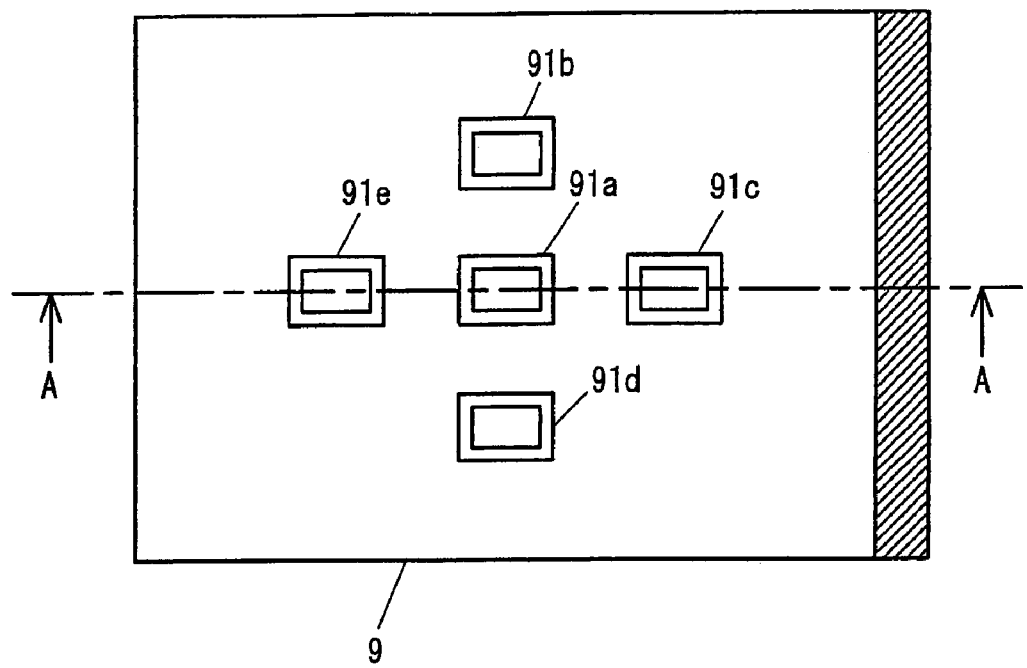
FIGS. 2A and 2B are figures showing an example of a liquid crystal display element 9.
Figure 2B:
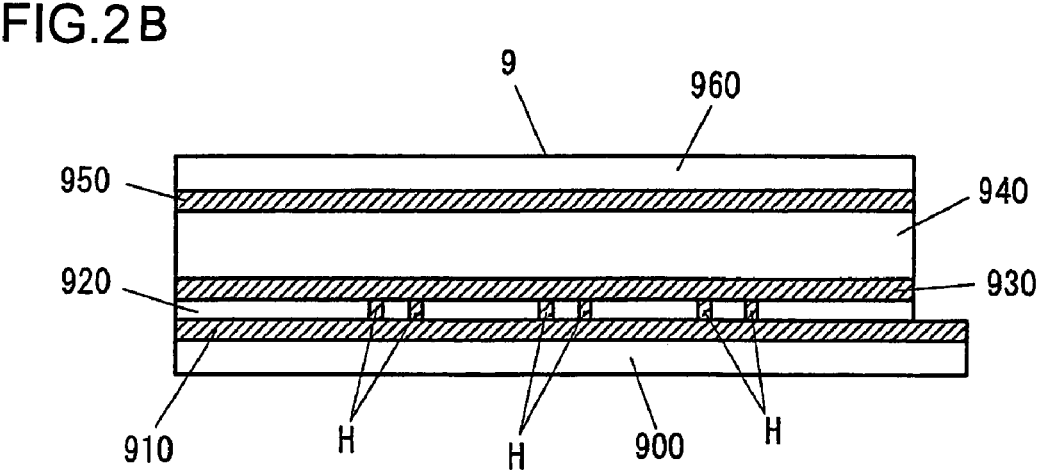

FIGS. 2A and 2B are figures showing an example of this liquid crystal display element 9, in which FIG. 2A is an elevation view thereof, and FIG. 2B is an A-A sectional view thereof. Here, an example will be explained where, as shown in FIG. 2A, AF area marks 91a through 91e are displayed as rectangular ring shaped marks that correspond to the AF areas. Normally the entire areas of the liquid crystal display element 9 are in the transparent state, so that the image of the photographic subject that has been imaged upon the viewfinder screen 6 is observed via the liquid crystal display element 9. And, when actuation for confirming the focus position is performed by half press actuation of the release button of the camera or the like, the AF area mark that corresponds to that AF area where the focus is best adjusted is displayed as black, so that one of the AF area marks 91a through 91e comes to be displayed as superimposed over the image of the photographic subject.

As shown in the sectional view of FIG. 2B, in this liquid crystal display element 9, a liquid crystal layer 940 is sandwiched between a pair of transparent substrates 900, 960 that are made from glass or the like. A seal member is provided between the transparent substrates 900, 960 around their border portions, although this feature is not shown in the drawings. Upon the transparent substrate 960, a transparent electrode layer 950 is formed over its entire area. On the other hand, a wiring layer 910, an insulating layer 920, and a transparent electrode layer 930 are formed in order upon the transparent substrate 900.

Both the wiring layer 910 and the transparent electrode layers 930 and 950 are transparent electrically conductive layers that are made from indium tin oxide (ITO), and, as will be described hereinafter, electrodes that correspond to the AF area marks 91a through 91e are patterned in the transparent electrode layer 930, while wiring is patterned in the wiring layer 910. The electrodes of the transparent electrode layer 930 and the transparent electrode layer 950 are connected to a drive circuit 13 via the wiring of the wiring layer 910, and the voltage applied to these electrodes is controlled by the drive circuit 13.

The drive circuit 13 is connected to a power supply 15 and a control circuit 16, and supplies voltage from the power supply 15 to the electrodes. The control circuit 16 controls the drive circuit 13 to supply the voltage to the electrodes and also performs photographic controls of the camera. In case that the camera is a digital camera, the film 4 as the recording medium is replaced with an image sensor 4 and the control circuit 16 controls the image sensor 4.

The insulating layer 920 is an electrically insulating layer that is provided so that there should be no continuity between portions of the transparent electrode layer 930 and the wiring layer 910 for which such continuity is not required; an acrylic type material may be, for example, employed for this layer. Through holes H are formed in this insulating layer 920, corresponding to the various electrodes of the transparent electrode layer 930. Accordingly, during manufacture of the transparent electrode layer 930, when a transparent electrically conductive layer is formed from ITO over the insulating layer 920 in which the through holes H have been formed, the ITO penetrates within these through holes H, and each of the electrodes of the transparent electrode layer 930 is thereby connected via its through hole H with the corresponding wiring that has been formed upon the wiring layer 910.

Next, the various layers of the liquid crystal display element 9 will be explained in detail using FIGS. 3A through 3C. FIG. 3A is a figure showing the transparent electrode layer 930: in this transparent electrode layer 930, there are provided five ring shaped electrodes 931 that correspond to the various AF area marks 91*a* through 91*e*, five isolated electrodes 932 that are formed in the inside regions of these five ring shaped electrodes 931 that are closed, and one surrounding electrode (outer electrode) 933 that is formed in the region around the ring shaped electrodes 931. Minute gaps for insulation are formed at the boundaries between the ring shaped electrodes 931 and the isolated electrodes 932, and at the boundaries between the ring shaped electrodes 931 and the surrounding electrode 933. The ring shaped electrodes 931 are each formed in a closed rectangular loop in this embodiment.

FIG. 3B is a figure showing the insulating layer 920. In this insulating layer 920, there are formed five through holes H1 that oppose the ring shaped electrodes 931 formed in the transparent electrode layer 930, five through holes H2 that oppose the isolated electrodes 932, a single through hole H3 that opposes the surrounding electrode 933, and five through holes H4. It should be understood that the broken lines show the positions of the ring shaped electrodes 931.

FIG. 3C is a figure showing the wiring provided upon the wiring layer 910; the positions of the ring shaped electrodes 931 are shown by the broken lines, in the same manner as in FIG. 3B. Lead wires 911, 912 are wires that connect the drive circuit 13 to the electrodes 931, 933: the lead wires 911 are connected to the ring shaped electrodes 931 via the through holes H1, while the lead wire 912 is connected to the surrounding electrode 933 via the through hole H3.

The right end portions as seen in the figures of these lead wires 911, 921 are exposed as extended wiring portions for connection to the drive circuit 13. Bypass wires 913 are bypass wires for connecting the isolated electrodes 932, that are provided on the insides of the ring shaped electrodes 931, to the surrounding electrode 933; and thereby the electrical potential upon these isolated electrodes 932 is always kept at the same electrical potential as that of the surrounding electrode 933.

With the liquid crystal display element 9 of the structure shown in FIGS. 3A through 3C, when for example displaying the AF area mark 91*a* in the center of FIG. 1 as black, the electrical potential upon the corresponding ring shaped electrode 931 at the center is brought to the same electrical potential as that of the opposing transparent electrode layer 950, while the electrical potentials of the other ring shaped electrodes 931 and of the surrounding electrode 933 are controlled so as to be different from the electrical potential of the transparent electrode layer 950. As a result, the portion of the liquid crystal material behind the ring shaped electrode 931 in the center is put into the state in which it scatters light isotropically, so that, when seen through the viewfinder, the portion of the AF area mark 91*a* comes to be seen as dark.

With this liquid crystal display element 9 of the first embodiment, since the regions of the liquid crystal under the isolated electrodes 932 and the surrounding electrode 933 are always used in the transparent state, accordingly it is arranged to connect the isolated electrodes 932 that are surrounded by the ring shaped electrodes 931 with the bypass wires 913 to the surrounding electrode 933, so as to keep them at the same electrical potential. Due to this, it is possible to omit any further wiring related to the isolated electrodes 932, so that, along with it being possible to suppress increase of the wiring resistance, also it is possible to anticipate an enhancement of the yield rate during manufacture.

FIG. 4 is a figure showing an example of wiring in a prior art type liquid crystal display element; this wiring is shown as superimposed over electrodes 931 through 933. In this prior art, respective lead wires 911, 912, and 914 are led out from each of the electrodes 931 through 933, and it is arranged to extend this wiring outwards until the drive circuit 13 is connected. This is an invitation to increase of the pattern resistance, due to extension of the wiring pattern, and the problem arises of decrease of the yield rate during manufacture. As will be understood from comparison of FIG. 4 and FIG. 3C, with this first embodiment of the present invention, the number of lead wires can be almost halved, from the eleven of the prior art to six. This number by which the lead wires are reduced becomes the greater, the greater is the number of marks that are to be displayed by the closed ring shaped electrodes.

In this embodiment, the following beneficial operational effects are obtained.

(1) It is possible to reduce the number of lead wires below the number in the prior art by providing, between the electrically insulating layer 921 and the substrate 900, the wiring layer 910 upon which are formed the bypass wires 913 that connect the isolated electrodes 932 to the surrounding electrode 933 via the through holes H2 and H4. As a result, along with it being possible to reduce the amount of wiring and thus to prevent elevation of the wiring resistance, also it is possible to anticipate enhancement of the yield rate during manufacture.

(2) Furthermore it is possible to obtain a display device that provides the same advantageous effects, by providing the liquid crystal display element 9 of this type, the power supply 15 that applies voltages to the various electrodes 931 through 933 via the first and second lead wires 911 and 912, and the drive circuit 13 and the control circuit 16 that control the voltages applied by the power supply 15 and thus causes marks to be displayed upon the liquid crystal display element 9 as appropriate.

Embodiment Two

FIG. 5 is a figure showing an example of an in-viewfinder display according to a second embodiment of the present invention. In the lower left region of the viewfinder, a legend M1 that indicates the shutter speed and a legend M2 that indicates the aperture value are displayed as superimposed upon the image of the photographic subject. These values of the shutter speed and the aperture are shown by numerals and alphabetic letters that are displayed by using a plurality of segments in appropriate patterns. The term "legend" includes "mark", "icon", "figure", "symbol", "character", "text", "alphanumeric sequence" or other indication in this embodiment.

FIG. 6 is a figure that relates to a display unit for one character upon the liquid crystal display element 9, and shows the electrodes, the through holes, and the wiring as superimposed. And FIG. 7 is a figure showing a cross section of FIG. 6 taken in a plane shown by the line B-B in FIG. 6. In the same manner as in the first embodiment, a wiring layer 910, an insulating layer 920, and a transparent electrode layer 930 are formed in order upon a transparent substrate 900. A plurality of electrodes of predetermined shapes are formed upon the transparent electrode layer 930. Electrically insulating gaps are formed between adjacent ones of these electrodes. In the following, these gaps will be referred to as insulating portions.

In FIG. 7, three of the electrodes in the transparent electrode layer 930 are shown. A through hole H is formed in the insulating layer 920, and the center electrode in the figure and a wire in the wiring layer 910 are electrically connected together via ITO in this through hole H. On the other hand, a transparent electrode layer 950 is formed over the entire area on the inner surface of an opposing transparent substrate 960. A liquid crystal layer 940 that is made from a polymer dispersed liquid crystal is provided between the transparent electrode layer 930 and the transparent electrode layer 950. And a hologram 941 is formed at the portion of the liquid crystal layer 940 that opposes the center electrode, that is an electrode of the transparent electrode layer 930 for some mark.

This hologram 941 may be formed by a per se known technique, such as for example the method described in Japanese Laid-Open Patent Publication 2006-330103. It should be understood that since, in this second embodiment, the hologram 941 is employed in the liquid crystal display element 9, accordingly an illumination light source should be added to the block diagram shown in FIG. 1, for shining illuminating light into the substrate from the side of the liquid crystal display element 9

FIGS. 8 through 10 are figures relating to the display unit shown in FIG. 6, and respectively show plan views of the transparent electrode layer 930, the insulating layer 920, and the wiring layer 921 shown in FIG. 7. As shown in FIG. 8, in the transparent electrode layer 930, there are formed seven mark electrodes 934A through 934G that are provided for displaying one character of a legend, two isolated electrodes 932A and 932B, and a surrounding electrode (an outer electrode) that is provided around the mark electrodes 934A through 934G.

FIG. 11 is an enlarged view of the portion where the mark electrodes 934E, 934F, and 934G approach one another. Insulating portions 935, in other words gaps for insulation, are formed between the various electrodes 932A, 932B, 933, and 934E through 934G. The thick solid lines in FIG. 8 that delimit the contours of the electrodes correspond to the insulating portions 935 in FIG. 11. Although, in FIG. 11, only the hologram 941 that lies over the mark electrode 934F is shown, in actual fact, such holograms are formed at the portions that oppose each of the mark electrodes 934A through 934G. It should be understood that the shape of the hologram 941 when seen in plan view is almost the same as the shape of the mark electrode to which it corresponds.

FIG. 9 is a plan view of the insulating layer 920. Through holes H11 through H17 and H21 through H25 are formed in this insulating layer 920, so as to pierce through it vertically. It should be understood that, in FIG. 9, in order to make the positional relationships between the through holes and the electrodes easily understood, the mark electrodes are shown by double dotted broken lines, and the corresponding reference symbols in parentheses are appended to these electrodes. The through holes H11 through H17 are formed in positions that correspond to the mark electrodes 934A through 934G. And the through hole H21 is formed in a position that corresponds to the isolated electrode 932A, while the two through holes H22 and H23 are formed in positions that correspond to the isolated electrode 932B. Moreover, the two through holes H24 and H25 are formed in positions that correspond to the surrounding electrode 933.

FIG. 10 is a plan view of the wiring layer 910. It should be understood that, in FIG. 10, in order to make the positional relationships between the through holes and the electrodes easily understood, the mark electrodes are shown by double dotted broken lines, and, along with showing the through holes by dotted lines, the corresponding reference symbols in parentheses are appended to these through holes. The lead wires 911 are wires that connect the mark electrodes 934A through 934G (refer to FIG. 8) to the drive circuit 13 (refer to FIG. 1), and they are connected to the mark electrodes 934A through 934G of the transparent electrode layer 930 via the respective through holes H11 through H17. And the lead wire 912 is a wire that connects the surrounding electrode 933 to the drive circuit 13, and it is connected to the surrounding electrode 933 via the through hole H25. In the same manner as in the case of FIG. 3C, the right end portions of these lead wires 911, 912 are exposed as lead out portions for connection to the drive circuit 13.

On the other hand, the isolated electrodes 932A and 932B that are surrounded by the mark electrodes are connected together by a bypass wire 915. Furthermore, the isolated electrode 932B is connected to the surrounding electrode 933 by a bypass wire 913. By passing through the through holes H21 and H22, the bypass wire 915 connects together the isolated electrodes 932A and 932B while bypassing the mark electrode 934G. In the same manner, by passing through the through holes H23 and H24, the bypass wire 913 connects together the isolated electrode 932B and the surrounding electrode 933, while bypassing the mark electrode 934D. As a result, the isolated electrodes 932A and 932B, and the surrounding electrode 933, are always kept at the same electrical potential.

It should be understood that although, in FIG. 10, it is arranged to connect together the isolated electrode 932A and the isolated electrode 932B by the bypass wire 915, so that the isolated electrode 932A is kept at the same electrical potential as the surrounding electrode 933, it would also be acceptable to provide a bypass wire between the isolated electrode 932A and the surrounding electrode 933, so that the isolated electrode 932A and the surrounding electrode 933 are directly connected together. In both cases, the length of the wiring would be approximately the same.

FIGS. 12A and 12B are figures showing an example of a display provided by the liquid crystal display element shown in FIG. 6; FIG. 12A of the figures shows a case when the legend M1 (for the shutter speed) is being displayed, while FIG. 12B shows a case in which the legend M2 (for the aperture value) is being displayed. In the case of FIG. 12A, by providing four display units of the structure shown in FIG. 6, a four character legend M1 is displayed. It should be understood that, in the example shown in FIG. 12A, a shutter speed display of "640" shown as three digits is being displayed.

With the liquid crystal display element 9 shown in FIG. 6, in order for the portions of the liquid crystal that oppose the surrounding electrode 933 and the isolated electrodes 932A and 932B to always be in the transparent state, those electrodes are controlled to be at an electrical potential that is different from that of the opposing transparent electrode 950. In FIG. 12A, the display unit M14 at the left end is in the non-displaying state, and the mark electrodes 934A through 934G of this display unit M14 (refer to FIG. 6) are controlled to be at different electrical potential from that of the opposing transparent electrode 950. Due to this, the holograms 941 that are provided to oppose these mark electrodes 934A through 934G do not diffract the illumination light that is incident from the side of the substrate. As a result, the portions of the liquid crystal material at these mark electrodes 934A through 934G are in the transparent state.

The display unit M13 that is the second from the left in FIG. 12A is displaying the numeral "6". In this case, the mark electrodes 934A, 934B, 934C, 934D, 934F, and 934G of FIG. 6 are controlled to be at the same electrical potential as the opposing transparent electrode 950. As a result, the holograms 941 that are provided corresponding to these mark electrodes 934A through 934D, 934F, and 934G diffract the illumination light that is incident from the side of the substrate, so that the regions at that these mark electrodes are provided are seen as being illuminated. In the same manner, in the case of the display unit M12, the mark electrodes 934C and 934E through 934G are controlled to be at the same electrical potential as the opposing transparent electrode 950; and, in the case of the display unit M11, the mark electrodes 934A through 934F are controlled to be at the same electrical potential as the opposing transparent electrode 950.

In the case of the legend M2 shown in FIG. 12B, the display units M21 through M23 are of the same structure as the display unit shown in FIG. 6. The display unit M20 is a display unit for displaying the decimal point, and it includes a square mark electrode 936, a lead wire 911 that connects this mark electrode 936 and a drive circuit 13 not shown in the figure, and a through hole for connecting this lead wire 911 to the mark electrode 936. On the other hand, the display unit M24 is a display unit for displaying the alphabetic character "F", and it includes a mark electrode 937 that is formed in the shape of a letter "F", a lead wire 911 that connects this mark electrode 937 and the drive circuit 13 not shown in the figure, and a through hole for connecting this lead wire 911 to the mark electrode 937.

FIGS. 13A through 13C are figures showing another example of legends that are being displayed upon a liquid crystal display element 9. FIG. 13A shows a display unit that displays a legend indicating whether an auto white balance function is ON or OFF, and, as electrodes, there are included an isolated electrode in the shape of a letter "W", an isolated electrode in the shape of a letter "B", and mark electrodes 803, 804 that are provided around and within these characters. A surrounding electrode 933 is provided around the mark electrode 803.

The isolated electrode 801 is connected to the surrounding electrode 933 by a bypass wire 913, and moreover the isolated electrode 801 and the isolated electrode 802 are connected together by a bypass wire 915. Due to this, the isolated electrodes 801, 802 are always maintained at the same electrical potential as the surrounding electrode 933, and the liquid crystal layer portions in these regions are always in the transparent state. On the other hand, the mark electrodes 804 are connected together by another bypass wire 915, and the upper one of these mark electrodes 804 is connected to the mark electrode 803 by yet another bypass wire 915. And the mark electrode 803 is connected by a lead wire 911 to a drive circuit 13 that is not shown in the figures. Due to this, the mark electrode 803 and the mark electrodes 804 are controlled so as to be at the same electrical potential.

Holograms 941 that are formed in the same shapes as the mark electrodes 803, 804 are provided in the regions of the liquid crystal layer 940 (refer to FIG. 7) that oppose the mark electrodes 803, 804. Due to this, a legend like that shown in FIG. 13A may be displayed by controlling the mark electrodes 803, 804 to the same electrical potential as that of the transparent electrode 950 that opposes them. Conversely, by controlling the mark electrodes 803, 804 to a different electrical potential than that of the transparent electrode 950 that opposes them, the display shown in FIG. 13A may be cancelled, with the entire display unit going into the transparent state.

FIG. 13B shows a display unit that displays a legend indicating a battery remaining amount, and, as electrodes, there are included a surrounding electrode 933, mark electrodes 811, 812, and an isolated electrode 813. The mark electrodes 811, 812 are connected together by a bypass wire 915, and the mark electrode 811 is connected to a drive circuit 13 not shown in the figures by a lead wire 911. On the other hand, the isolated electrode 813 is connected to the surrounding electrode 933 by a bypass wire 913. As shown in FIG. 13B, the display may be illuminated by bringing the mark electrodes 811, 812 to the same electrical potential as that of the transparent electrode 950 that opposes them. Conversely, the display may be turned off by bringing the mark electrodes 811, 812 to a different electrical potential from that of the transparent electrode 950 that opposes them.

FIG. 13C shows a display unit that displays a legend indicating whether or not a memory card is installed in the camera. In this display unit, as electrodes, there are included mark electrodes 821, 822, an isolated electrode 823, and a surrounding electrode 933. The isolated electrode 823 is connected to the surrounding electrode 933 by a bypass wire 913. On the other hand, the mark electrode 821 and the mark electrode 822 are connected together by a bypass wire 915, and the mark electrode 822 is connected by a lead wire 911 to a drive circuit 13 that is not shown in the figure. Due to this, the mark electrodes 821, 822 are always controlled to be at the same electrical potential, and a legend as shown in FIG. 13C can be displayed by bringing the mark electrodes 821, 822 and the transparent electrode 950 that opposes them to the same electrical potential. Conversely, the display of this legend may be cancelled by bringing the mark electrodes 821, 822 and the transparent electrode 950 that opposes them to different electrical potentials.

FIGS. 14A and 14B are figures showing an example of a display that displays a legend M3 of another type. This legend M3 is provided by display units M31 and M32, and, in FIG. 14A, the character "O" is being displayed by the display unit 31, while the character "K" is being displayed by the display unit 32. On the other hand, in FIG. 14B, the character "N" is being displayed by the display unit 31, while the character "G" is being displayed by the display unit 32.

FIG. 15 is a figure showing the electrodes, wires, and through holes of the display unit M31 all mutually superimposed. This display unit M31 includes mark electrodes 830 through 834, isolated electrodes 835 and 836, a surrounding electrode 933, a bypass wire 915 that connects together the isolated electrodes 835 and 836, a bypass wire 913 that connects together the isolated electrode 836 and the surrounding electrode 933, lead wires 911 that connect the mark electrodes 830 through 834 to a drive circuit 13 not shown in the figures, and nine through holes H.

When the mark electrodes 830 through 833 and the transparent electrode 950 that opposes them are controlled to the same electrical potential, and the other mark electrode 834 is controlled to a different electrical potential from that of the transparent electrode 950, then, as shown in FIG. 14A, the character "O" is displayed as illuminated upon the display unit M31. On the other hand, when the mark electrodes 831 and 833 and the transparent, electrode 950 that opposes them are controlled to the same electrical potential, and the other mark electrodes 830 and 832 are controlled to a different electrical potential from that of the transparent electrode 950, then, as shown in FIG. 14B, the character "N" is displayed as illuminated upon the display unit M31.

FIG. 16 is a figure showing the electrodes, wires, and through holes of the display unit M32 all mutually superimposed. This display unit M32 includes mark electrodes 840 through 845, isolated electrodes 846 through 848, a surrounding electrode 933, bypass wires 915 that respectively connect together the isolated electrodes 846, 847 and the isolated electrodes 846, 848, a bypass wire 913 that connects together the isolated electrode 847 and the surrounding electrode 933, lead wires 911 that connect the mark electrodes 840 through 845 to a drive circuit 13 not shown in the figures, and twelve through holes H.

When the mark electrodes 841, 843, and 845 and the transparent electrode 950 that opposes them are controlled to the same electrical potential, and the other mark electrodes 840, 842, and 844 are controlled to a different electrical potential from that of the transparent electrode 950, then, as shown in FIG. 14A, the character "K" is displayed as illuminated upon the display unit M32. On the other hand, when the mark electrodes 840 through 842, 844, and 845 and the transparent electrode 950 that opposes them are controlled to the same electrical potential, and the other mark electrode 843 is controlled to a different electrical potential from that of the transparent electrode 950, then, as shown in FIG. 14B, the character "G" is displayed as illuminated upon the display unit M32.

FIGS. 17A and 17B are figures showing structures for a display unit, for cases in which a composition frame is displayed for helping with composition setting during photography. Due to differences in the shape of mark electrodes 960, a circular ring frame is displayed in the center of FIG. 17, while in FIG. 17B a rectangular frame is displayed. In both cases, there are included the mark electrode 960, five isolated electrodes 961A through 961E, a surrounding electrode 933, four bypass wires 915 that connect the isolated electrodes together, a bypass wire 913 that connects together the isolated electrode 961B and the surrounding electrode 933, a lead wire 911 that connects together the mark electrode 960 and a drive circuit 13 that is not shown in the figures, and a plurality of through holes H. This frame may be changed over between being displayed, and not being displayed, according to whether or not the mark electrode 960 is brought to the same electrical potential as a transparent electrode 950 that opposes it (refer to FIG. 7).

In the first embodiment described above, it was arranged to connect the isolated electrodes 932 that are surrounded by the ring shaped electrodes 931 to the surrounding electrode 933 by the bypass wires 913, and thereby shortening of the wiring was anticipated. On the other hand, in the second embodiment, as shown in FIG. 8, the isolated electrode 932A was not surrounded by a ring shaped electrode, but rather its periphery was surrounded by the plurality of mark electrodes 934A, 934B, 934G, and 934F.

Now, since the mark electrodes 934A through 934G are segment electrodes for displaying a character or a numeral, so that the display of the character or the numeral should not appear unnatural, the width of the insulating portion 935 between the various electrodes is kept as small as possible, provided that it is possible for it to provide insulation as appropriate. Due to this if, as shown in FIG. 18, a wiring electrode 950 were to be formed at the insulating portion 935 between the mark electrode 934E and the mark electrode 934F, so as to connect together the isolated electrode 932A and the surrounding electrode 933, then the gap between the mark electrodes becomes too large, and the display becomes unnatural.

However since, in the second embodiment, the isolated electrodes 932A and 932B are connected together by the bypass wire 915, and furthermore the isolated electrode 932B and the surrounding electrode 933 are connected together by the bypass wire 913, accordingly it is possible to reduce the gap between the mark electrodes as much as possible, and the production quality of the display is enhanced. Moreover, by connecting together electrodes that are always to be controlled to the same electrical potential by the bypass wires 915, as in the case of the mark electrodes 821 and 822 of FIG. 13C, it is possible to reduce the number of the lead wires 911. In the case of the isolated electrodes 846, 847, and 848 of FIG. 16, by connecting with the bypass wires 915 between the isolated electrodes where they are approached to one another, it is possible to reduce the total length of the wiring, as compared with the case of connecting each of the isolated electrodes to the surrounding electrode 933 with a bypass wire 913.

FIG. 19 shows a flowchart of a method for manufacturing the liquid crystal display element 9 according to the first embodiment or the second embodiment.

In step S1, the wiring layer 910 having wiring is formed upon the transparent substrates 900. In step S2, the insulating layer 920 having through holes H that correspond to positions of the wiring is proved upon the transparent substrate 900 upon which the wiring layer 910 is provided. In step S3, the transparent electrode layer 930 having electrodes that correspond to positions of the through holes H is provided upon the transparent substrate 900 upon which the insulating layer 920 is provided. In step S4, the transparent electrode layer 950 having an electrode formed over the entire area of the transparent substrate 960 is provided upon the transparent substrate 960.

In step S5, the transparent substrate 900 provided with the transparent electrode layer 930 in step S3 and the transparent substrate 960 provided with the transparent electrode layer 950 in step S4 are bonded together with a predetermined gap. In step S6, a liquid crystal material is injected into the gap between the transparent substrate 900 and the transparent substrate 960, and then the liquid crystal display element 9 is sealed.

In the liquid crystal display element 9 of the first embodiment, the transparent electrode layer 930 has electrodes that include the ring shaped electrode 931 that is formed in a closed loop, the isolated electrode 932 that is surrounded by the ring shaped electrode 931, and the surrounding electrode 933 that is arranged around the ring shaped electrode 931. And the isolated electrode 932 and the surrounding electrode 933 are electrically connected together by the bypass wiring 913.

In the liquid crystal display element 9 of the second embodiment, the transparent electrode layer 930 has electrodes that include the isolated electrode 932 that is surrounded by the insulating portion 935, a plurality of the mark electrodes 934 that are arranged so as to surround the isolated electrode 932 surrounded by the insulating portion 935 and the surrounding electrode 933 that is arranged around the plurality of mark electrodes 934. And the isolated electrode 932 and the surrounding electrode 933 are electrically connected together by the bypass wiring 913.

Although, in the above description of the first embodiment, the example of a polymer network liquid crystal material was explained, it would also be possible to employ a holographic polymer dispersed liquid crystal material or a guest-host liquid crystal material or the like in the liquid crystal display element. For example, if a holographic polymer dispersed liquid crystal material is employed as in the case of the second embodiment, then liquid crystal holograms are formed at the portions of the AF area marks 91*a* through 91*e*, and illumination light from the side surface of the liquid crystal display element is incident within the substrate. When no voltage is being applied, the liquid crystal holograms operate, and this illumination light is diffracted by the liquid crystal holograms, and this diffracted light is emitted in the direction of the penta prism 7, so that the AF area marks are displayed as being illuminated. On the other hand, when voltage is being applied, diffraction of the illumination light does not occur, and the AF area marks go into the turned off state, so that the display is turned off.

The above described embodiments are examples, and various modifications can be made without departing from the scope of the invention.

What is claimed is:

1. A liquid crystal display element, comprising:
electrodes that are formed upon a substrate, and include a mark electrode that is formed in a closed loop, an outer electrode that is arranged at a periphery of the mark electrode, and an isolated electrode that is surrounded by the mark electrode;
an electrically insulating layer that is disposed between the electrodes and the substrate, and in which a first through hole that corresponds to the mark electrode, a second through hole that corresponds to the outer electrode, and a third through hole that corresponds to the isolated electrode are formed; and
a wiring layer that is disposed between the electrically insulating layer and the substrate, and upon which a first wiring is formed that electrically connects the outer electrode and the isolated electrode via the second and third through holes, wherein
the electrically insulating layer further comprises a fourth through hole that corresponds to the outer electrode;
a second wiring arranged to extend to a lead-out portion to electrically connect the outer electrode to an external drive circuit via the fourth through hole; and
the first wiring is arranged not to extend to the lead-out portion.

2. A liquid crystal display element according to claim 1, wherein the wiring layer includes a first lead wire that is connected to the mark electrode via the first through hole, and a second lead wire that is connected to the outer electrode via the second through hole.

3. A display device, comprising:
a liquid crystal display element according to claim 2;
a power supply that applies voltages to the electrodes via the first and second lead wires; and
a control circuit that controls the voltages applied by the power supply, so as to cause the liquid crystal display element to display an indication.

4. A display device according to claim 3, wherein the liquid crystal display element comprises a liquid crystal that is a polymer dispersed liquid crystal.

5. A display device according to claim 3, wherein the liquid crystal display element displays a figure or a character according to the mark electrode to which voltage is applied via the wiring layer.

6. An observation device, comprising:
a display device according to claim 3; and
an optical element that creates an image with light that has passed through the liquid crystal display element.

7. A liquid crystal display element, comprising:
a plurality of substrates that sandwich a liquid crystal material;
electrodes that are provided between the liquid crystal material and one of the substrates, and include a first electrode that is surrounded by an insulating portion and is isolated, a plurality of second electrodes that are arranged so as to surround the isolated electrode surrounded by the insulating portion, and a third electrode that is arranged at a periphery of the second electrodes;
an electrically insulating layer that is disposed between the electrodes and the one of the substrates, and in which a first through hole that corresponds to the first electrode, a plurality of second through holes that correspond to the second electrodes, and a third through hole that corresponds to the third electrode; and
a wiring layer that is disposed between the electrically insulating layer and the one of the substrates, and upon which a first wiring is formed that electrically connects the third electrode and the first electrode via the first and third through holes, wherein
the liquid crystal material displays a character corresponding to a combination of the plurality of second electrodes to which voltage is applied via the wiring layer;
the electrically insulating layer further comprises a fourth through hole that corresponds to the third electrode;
a second wiring arranged to extend to a lead-out portion to electrically connect the third electrode to an external drive circuit via the fourth through hole; and
the first wiring is arranged not to extend to the lead-out portion.

8. A liquid crystal display element according to claim 1, further comprising:
a liquid crystal that is a polymer dispersed liquid crystal.

9. A liquid crystal display element according to claim 1, further comprising:
a liquid crystal in which a hologram is formed by a polymer dispersed liquid crystal in a region that corresponds to the mark electrode.

10. A camera, comprising:
a liquid crystal element according to claim 1;
an image sensor that captures an image with a photographic optical system; and
a photography control circuit that controls the image sensor, wherein
the liquid crystal display element displays control information related to the photography control circuit.

11. A liquid crystal display element, comprising:
a plurality of substrates that sandwich a liquid crystal material;
electrodes that are provided between the liquid crystal material and one of the substrates, and include a first electrode that is formed in a closed loop, a second electrode that is arranged at a periphery of the first electrode, and a third electrode that is surrounded by the first electrode and is isolated;
an electrically insulating layer that is disposed between the electrodes and the one of the substrates, and in which a first through hole that corresponds to the first electrode, a second through hole that corresponds to the second electrode, and a third though hole that corresponds to the third electrode are formed; and a wiring layer that is disposed between the electrically insulating layer and the one of the substrates, and upon which a first wiring is formed that electrically connects the second electrode and the third electrode via the second and third through holes, wherein orientation of the liquid crystal material is controlled by voltage being applied to the electrodes via the wiring layer so as to display an indication;

the electrically insulating layer further comprises a fourth through hole that corresponds to the second electrode;

a second wiring arranged to extend to a lead-out portion to electrically connect the second electrode to an external drive circuit via the fourth through hole; and the first wiring is arranged not to extend to the lead-out portion.

12. A liquid crystal display element, comprising:

electrodes that are formed upon a substrate, and include an isolated electrode that is surrounded by an insulating portion, a mark electrode that is arranged so as to surround the isolated electrode surrounded by the insulating portion, and an outer electrode that is arranged at a periphery of the mark electrode;

an electrically insulating layer that is disposed between the electrodes and one of the substrates, and in which a first through hole that corresponds to the isolated electrode, a second through hole that corresponds to the mark electrode, and a third through hole that corresponds to the outer electrode are formed; and a wiring layer that is disposed between the electrically insulating layer and the one of the substrates, and upon which a first wiring is formed that electrically connects the outer electrode and the isolated electrode via the first and third through holes, wherein the electrically insulating layer further comprises a fourth through hole that corresponds to the outer electrode;

a second wiring arranged to extend to a lead-out portion to electrically connect the outer electrode to an external drive circuit via the fourth through hole; and the first wiring is arranged not to extend to the lead-out portion.

13. A liquid crystal display element according to claim 12, wherein:

the electrodes comprise a plurality of the mark electrodes and a plurality of the isolated electrodes;

the electrically insulating layer comprises a plurality of the first through holes that correspond to the plurality of isolated electrodes and a plurality of the third through holes that correspond to the plurality of mark electrodes; and the wiring layer includes a third wiring that electrically connects together via the first and third through holes, among the plurality of mark electrodes or the plurality of isolated electrodes, mark electrodes or isolated electrodes that are to be controlled to be at the same electrical potential.

14. A liquid crystal display element according to claim 13, wherein the plurality of mark electrodes display a character by a combination of the plurality of mark electrodes.

15. A liquid crystal display element according to claim 12, wherein the wiring layer includes a first lead wire that is connected to the mark electrode via the second through hole, and a second lead wire that is connected to the outer electrode via the third through hole.

16. A liquid crystal display element according to claim 12, further comprising:

a liquid crystal that is a polymer dispersed liquid crystal.

17. A liquid crystal display element according to claim 12, further comprising:

a liquid crystal in which a hologram is formed by a polymer dispersed liquid crystal in a region that corresponds to the mark electrode.

18. A liquid crystal display element, comprising:

a plurality of substrates that sandwich a liquid crystal material;

electrodes that are provided between the liquid crystal material and one of the substrates, and include a first electrode that is surrounded by an insulating portion and is isolated, a second electrode that is arranged so as to surround the isolated electrode surrounded by the insulating portion, and a third electrode that is arranged at a periphery of the second electrode;

an electrically insulating layer that is disposed between the electrodes and the one of the substrates, and in which a first through hole that corresponds to the first electrode, a second through hole that corresponds to the second electrode, and a third through hole that corresponds to the third electrode; and a wiring layer that is disposed between the electrically insulating layer and the one of the substrates, and upon which a first wiring is formed that electrically connects the third electrode and the first electrode via the first and third through holes, wherein orientation of the liquid crystal material is controlled by voltage being applied to the electrodes via the wiring layer so as to display an indication;

the electrically insulating layer further comprises a fourth through hole that corresponds to the third electrode;

a second wiring arranged to extend to a lead-out portion to electrically connect the third electrode to an external drive circuit via the fourth through hole; and the first wiring is arranged not to extend to the lead-out portion.

19. A method for manufacturing a liquid crystal display element, comprising:

providing, upon a substrate, a wiring layer having a first wiring and a second wiring;

providing, upon the substrate upon which the wiring layer is provided, an electrically insulating layer having a first through hole, a second through hole, a third through hole, and a fourth through; and providing, upon the substrate upon which the electrically insulating layer is provided, a mark electrode that is formed in a closed loop and corresponds to a position of the first through hole, an isolated electrode that is surrounded by the mark electrode and corresponds to a position of the third through hole, and an outer electrode that is arranged at a periphery of the mark electrode and corresponds to a position of the second through hole and a position of the fourth through hole, wherein the isolated electrode and the outer electrode are electrically connected together by the first wiring;

the second wiring is arranged to extend to a lead-out portion to electrically connect the outer electrode to an external drive circuit via the fourth through hole; and the first wiring is arranged not to extend to the lead-out portion.

20. A method for manufacturing a liquid crystal display element, comprising:

forming, upon a substrate, a wiring layer having a first wiring and a second wiring;

providing, upon the substrate upon which the wiring layer is provided, an electrically insulating layer having a plurality of first through holes, a second through hole, a third through hole and a fourth through hole;

providing, upon the substrate upon which the electrically insulating layer is provided, an isolated electrode that is surrounded by an insulating portion and corresponds to a position of the third through hole, a plurality of mark electrodes that are arranged so as to surround the isolated electrode surrounded by the insulating portion and corresponds to positions of the plurality first through holes, and an outer electrode that is arranged at a periphery of the plurality of mark electrodes corresponds to a position of the second through hole and a position of the fourth through hole, wherein the isolated electrode and the outer electrode are electrically connected together by the first wiring;

the second wiring is arranged to extend to a lead-out portion to electrically connect the outer electrode to an external drive circuit via the fourth through hole; and the first wiring is arranged to extend to the lead-out portion.

* * * * *